(12) United States Patent
Terao et al.

(10) Patent No.: US 8,086,629 B2
(45) Date of Patent: Dec. 27, 2011

(54) CONTENT DELIVERY APPARATUS, CONTENT DELIVERY METHOD, AND CONTENT DELIVERY PROGRAM

(75) Inventors: Kyoichi Terao, Nerima-ku (JP); Itaru Takemura, San Jose, CA (US)

(73) Assignee: Pioneer Corporation, Tokyo (JP)

( * ) Notice: Subject to any disclaimer, the term of this patent is extended or adjusted under 35 U.S.C. 154(b) by 137 days.

(21) Appl. No.: 12/593,785

(22) PCT Filed: Mar. 29, 2007

(86) PCT No.: PCT/JP2007/056915
§ 371 (c)(1),
(2), (4) Date: Mar. 16, 2010

(87) PCT Pub. No.: WO2008/120366
PCT Pub. Date: Oct. 9, 2008

(65) Prior Publication Data
US 2010/0191756 A1    Jul. 29, 2010

(51) Int. Cl.
*G06F 17/30* (2006.01)
(52) U.S. Cl. .................. 707/770; 707/913; 707/967
(58) Field of Classification Search .......... 707/770, 707/913, 967, 999.01, 999.107, 622; 709/230, 709/231, 201, 229
See application file for complete search history.

(56) References Cited

U.S. PATENT DOCUMENTS

| | | | | |
|---|---|---|---|---|
| 7,003,514 B2* | 2/2006 | Dutta et al. | .................. | 707/754 |
| 7,818,402 B1* | 10/2010 | Zhang | .................. | 709/219 |
| 7,860,876 B2* | 12/2010 | Frieder et al. | .................. | 707/759 |
| 7,860,887 B2* | 12/2010 | Cohen et al. | .................. | 707/781 |
| 7,953,083 B1* | 5/2011 | Evans et al. | .................. | 370/390 |
| 7,986,637 B2* | 7/2011 | Panwar et al. | .................. | 370/254 |
| 2002/0147815 A1 | 10/2002 | Tormasov et al. | | |
| 2003/0204602 A1* | 10/2003 | Hudson et al. | .................. | 709/228 |
| 2006/0007947 A1 | 1/2006 | Li et al. | | |

FOREIGN PATENT DOCUMENTS

| | | |
|---|---|---|
| JP | 2004-180258 | 6/2004 |
| JP | 2006-025408 | 1/2006 |
| JP | 2006-107349 | 4/2006 |
| JP | 2006-178782 | 7/2006 |
| JP | 2006-244223 | 9/2006 |

OTHER PUBLICATIONS

Extended European Search Report dated Feb. 3, 2011, issued in corresponding European Application No. 07740353.3-1244.
Isamu Kaneko, "The technology of Winny", ASCII, Oct. 2005, (English language concise explanation of relevance only; also see Background Section of specification) 1 page.
Wikipedia entry for "Winny" http://en.wikipedia.org/wiki/Winny, 5 pages.
International Search Report for PCT/JP2007/056915, mailed Jul. 3, 2007.
"Winny no Gijutsu' Dai 2 Dan!! Winny no Gijutsu ni Semaru", Network Magazine, Feb. 1, 2005, vol. 10, No. 2, 10 pages.

* cited by examiner

*Primary Examiner* — Leslie Wong
(74) *Attorney, Agent, or Firm* — Nixon & Vanderhye PC

(57) ABSTRACT

In a content delivery method in a P2P network 20, a content publishing node divides a publish content according to a situation of each downstream node adjacent thereto, and causes each downstream node to hold a divided content, and a content downloading node simultaneously downloads in parallel the divided contents from the plurality of downstream nodes. When a plurality of pieces of tag information on a plurality of divided contents of a same content is received form a downstream node, the plurality of pieces of tag information are merged to be distributed in upstream nodes.

12 Claims, 23 Drawing Sheets

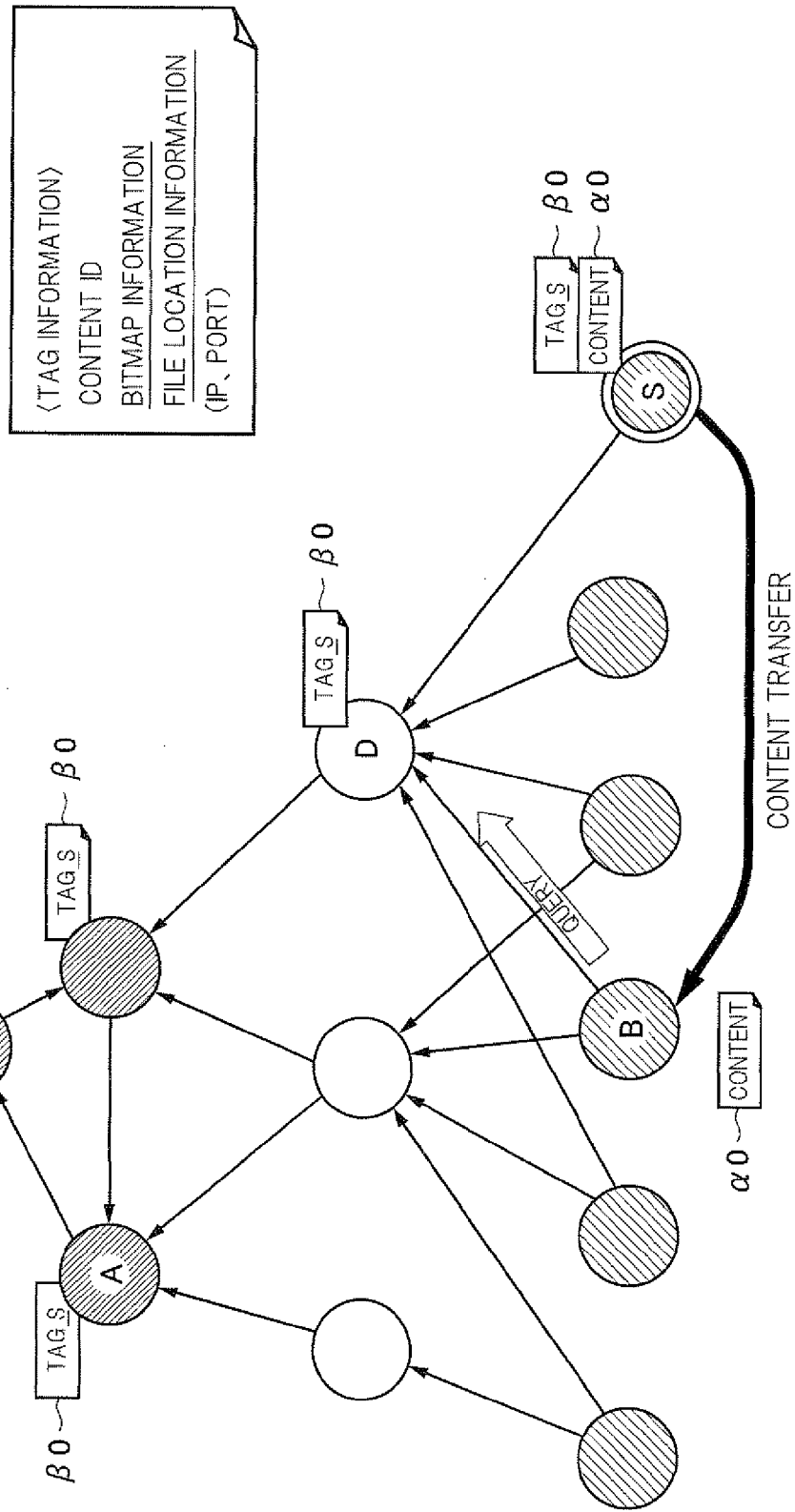

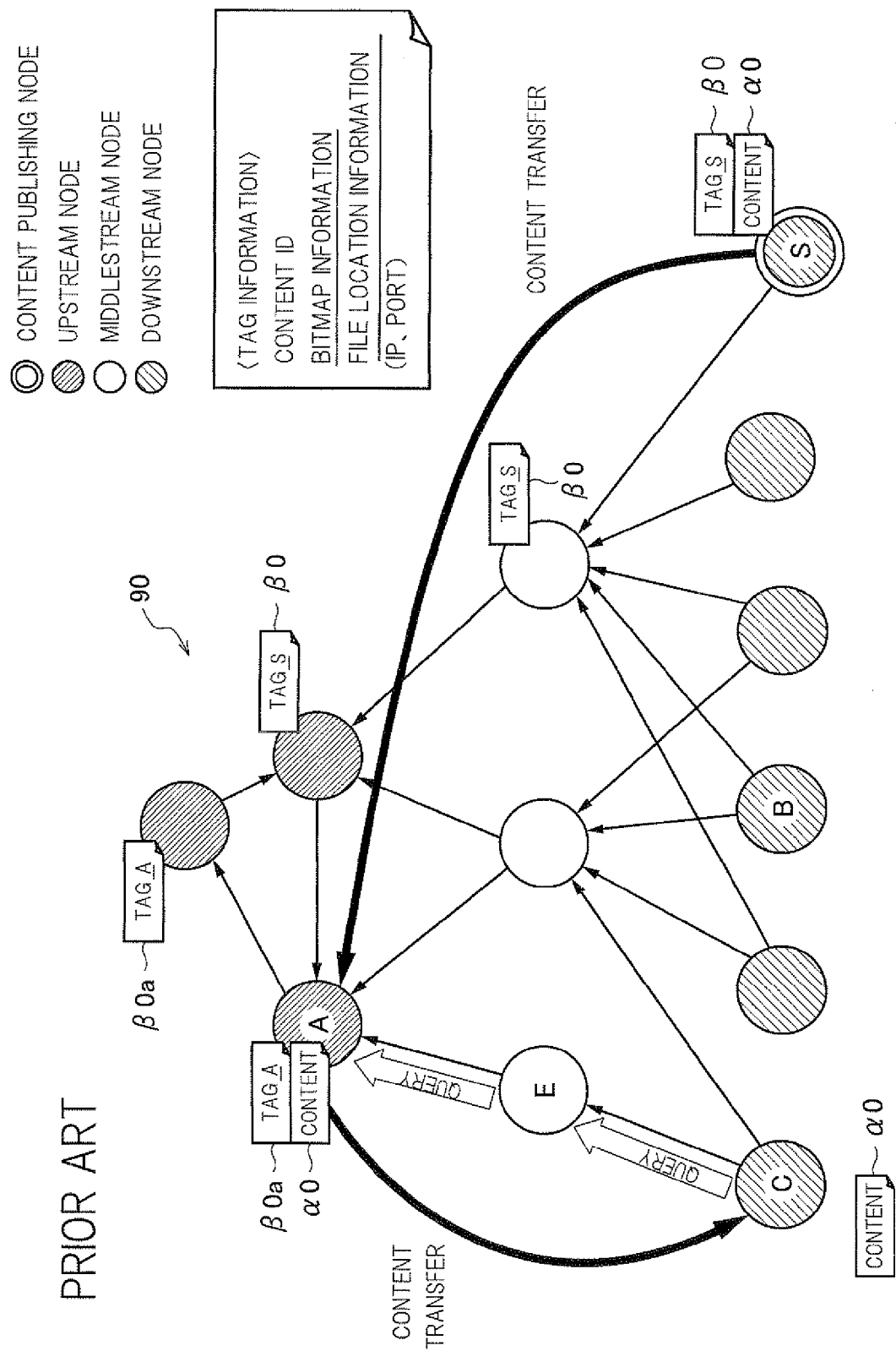

[FIG.3]
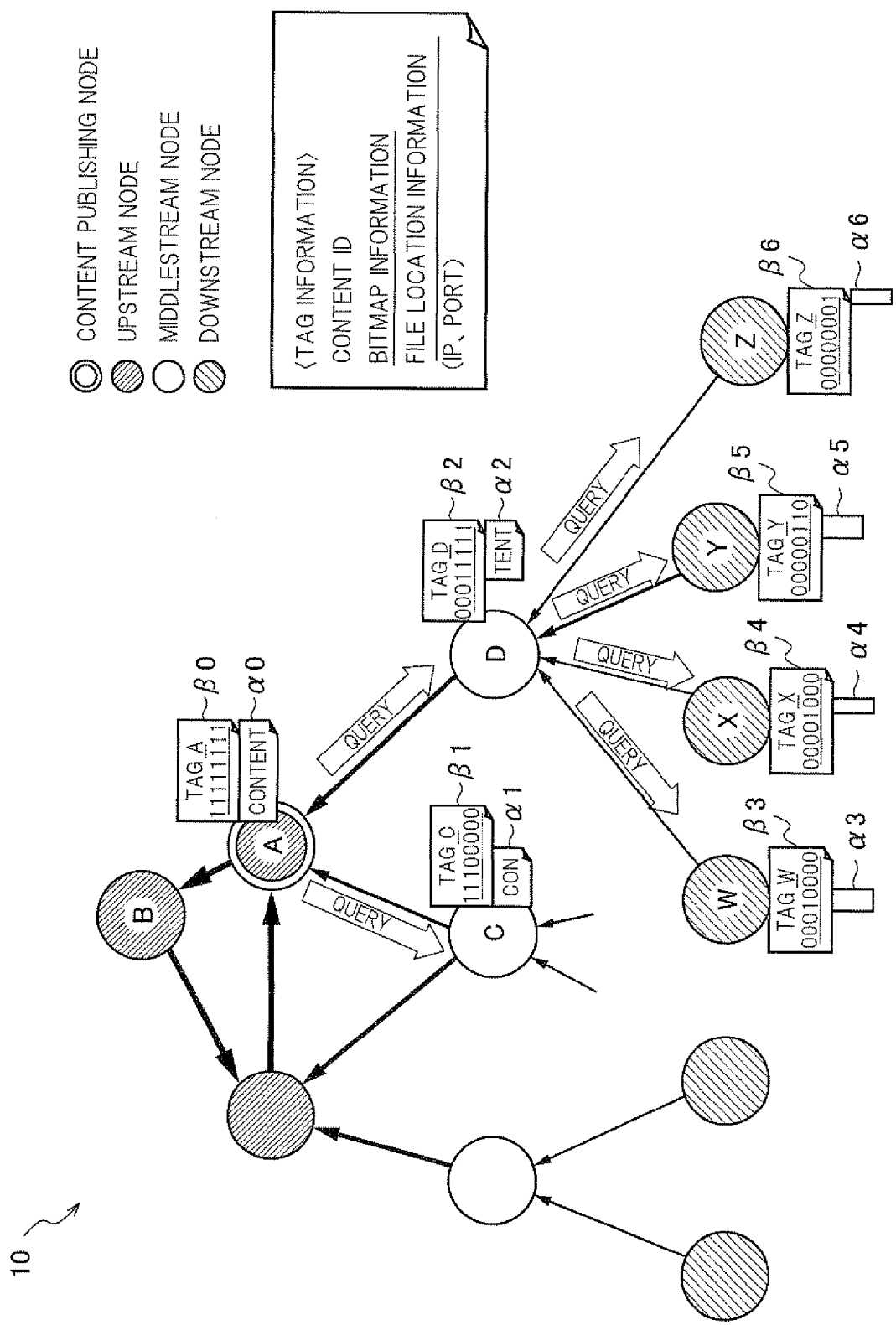

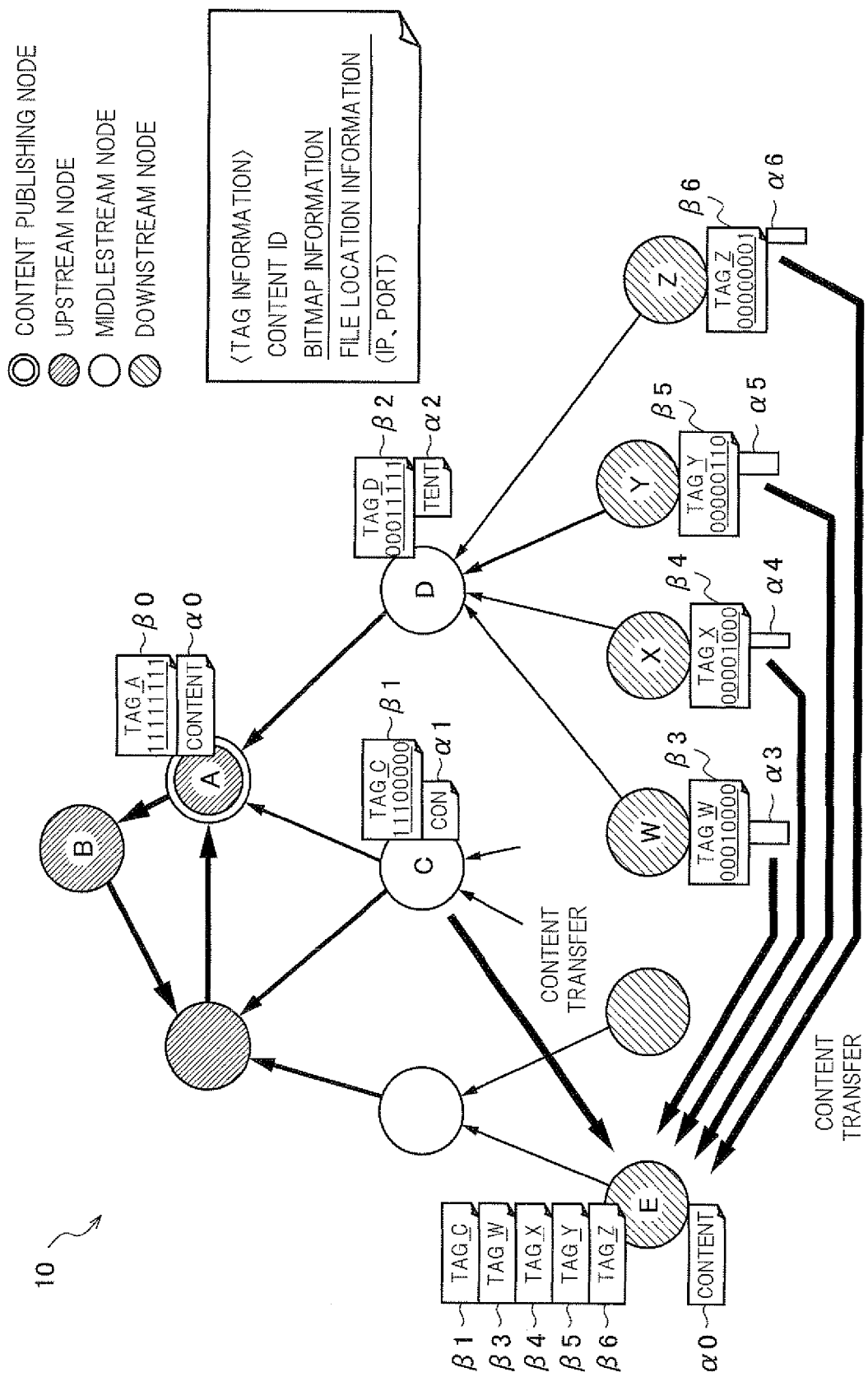
[FIG.4]

[FIG.5]
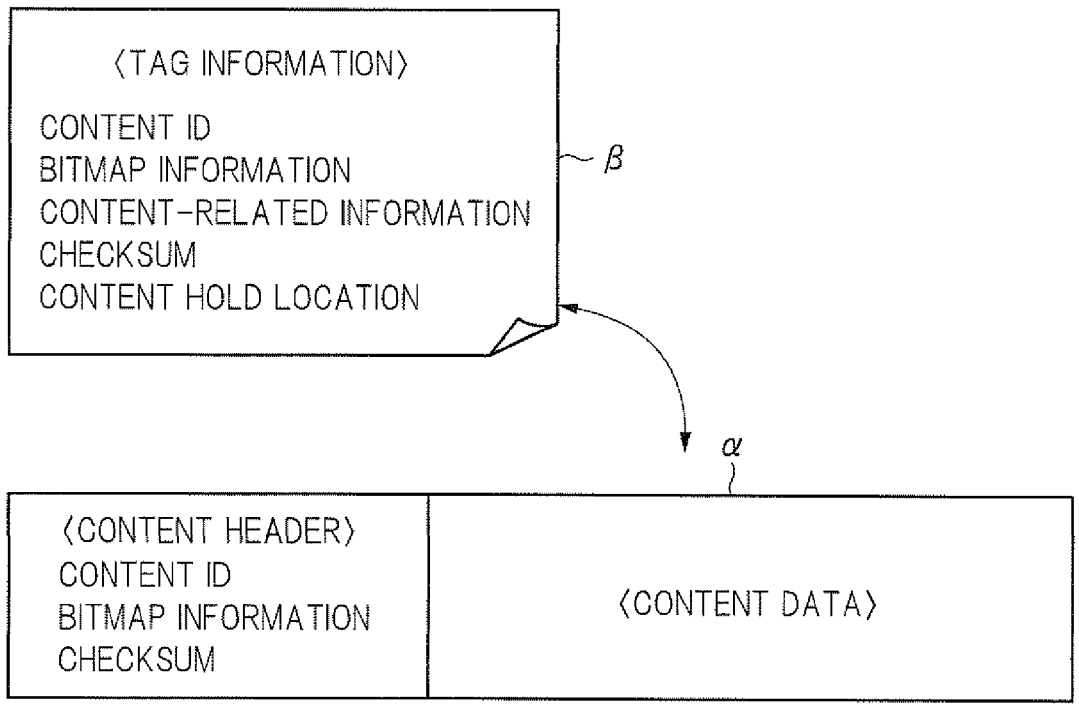
[FIG.6]
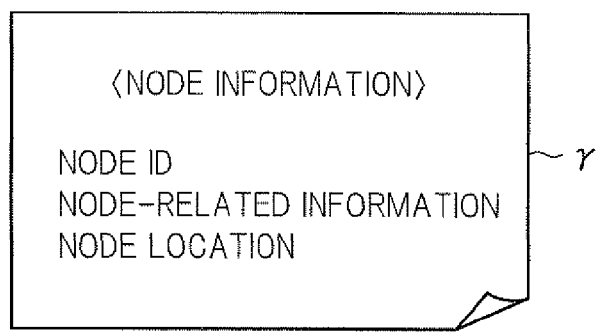

[FIG.7]
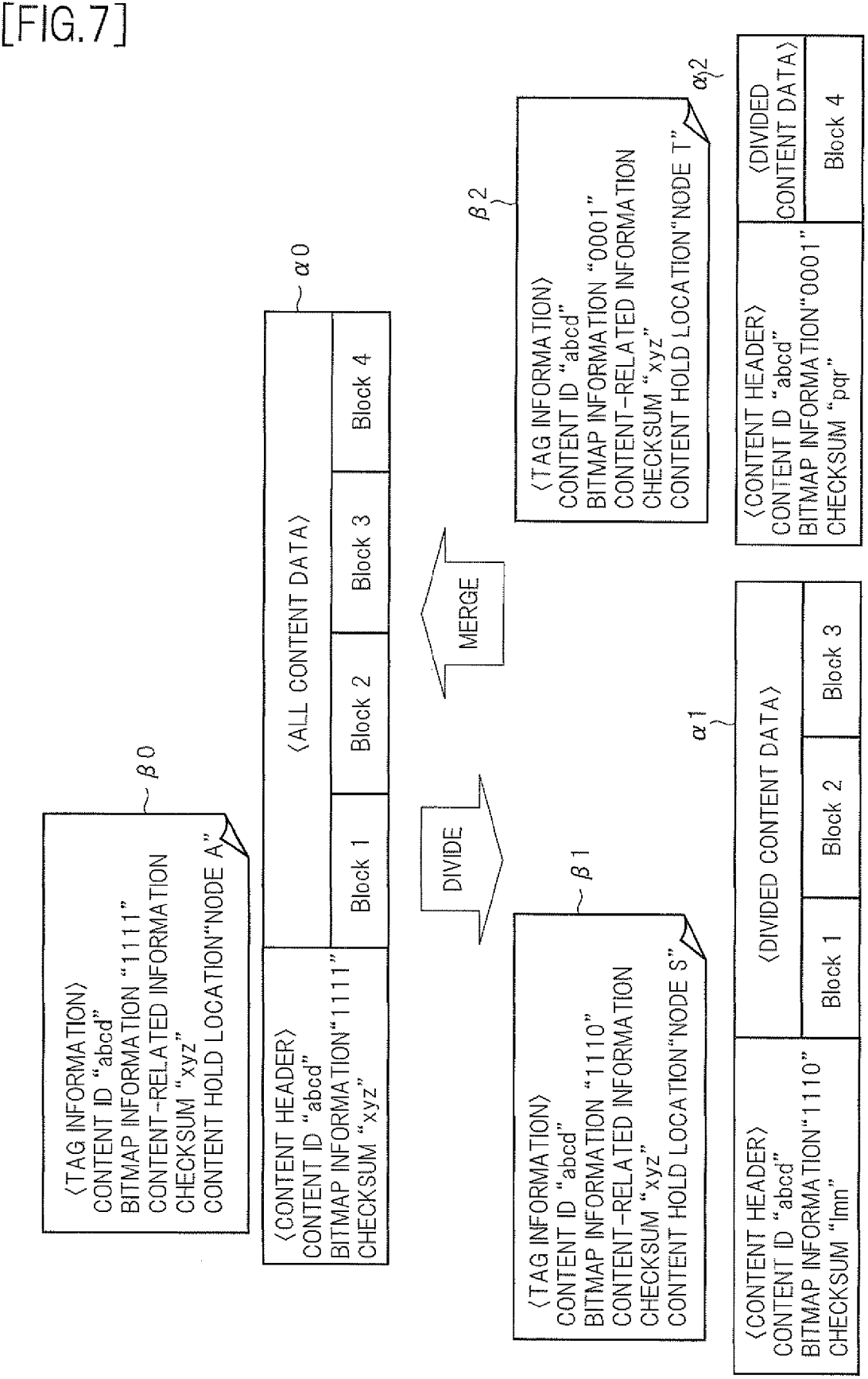

[FIG.8]
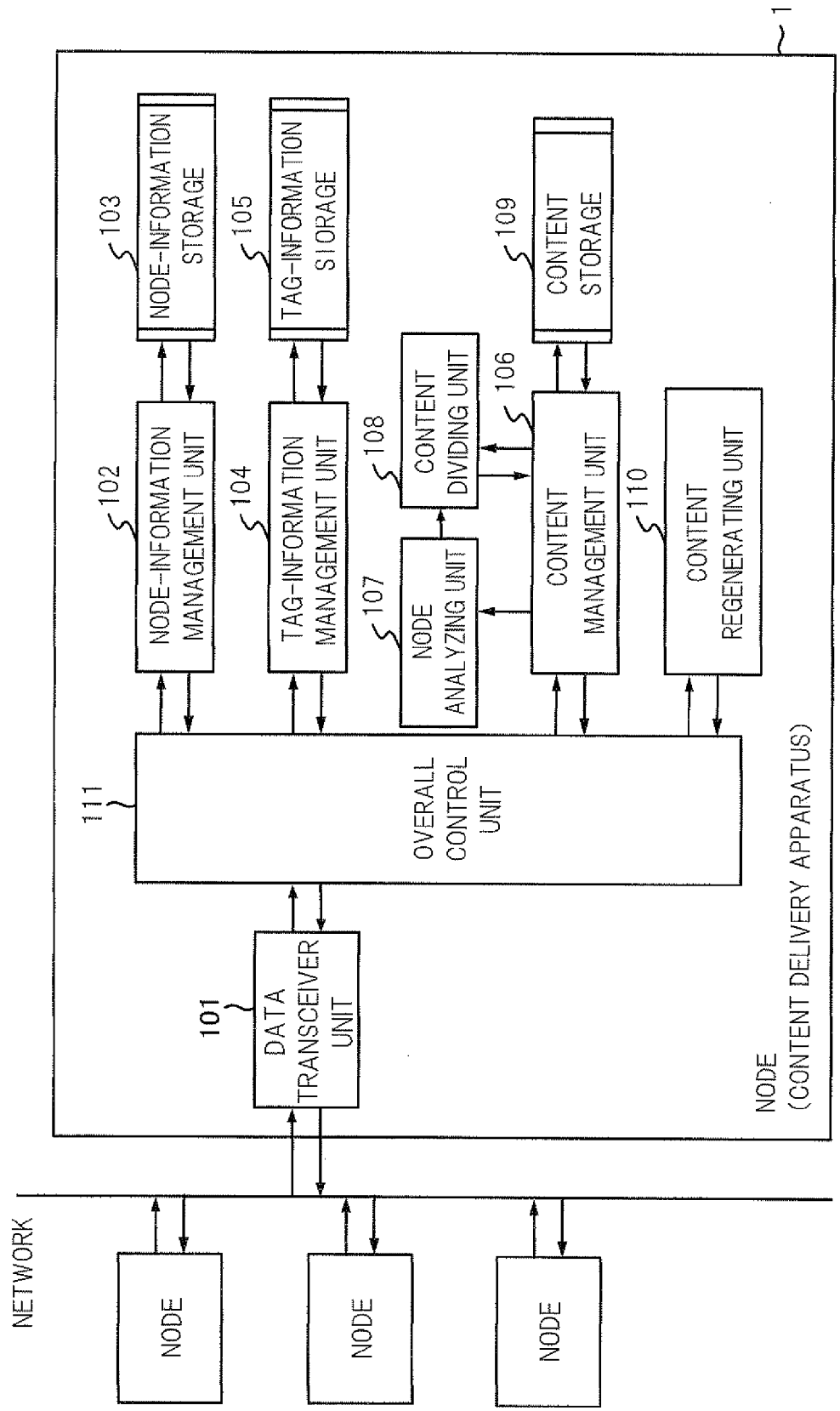

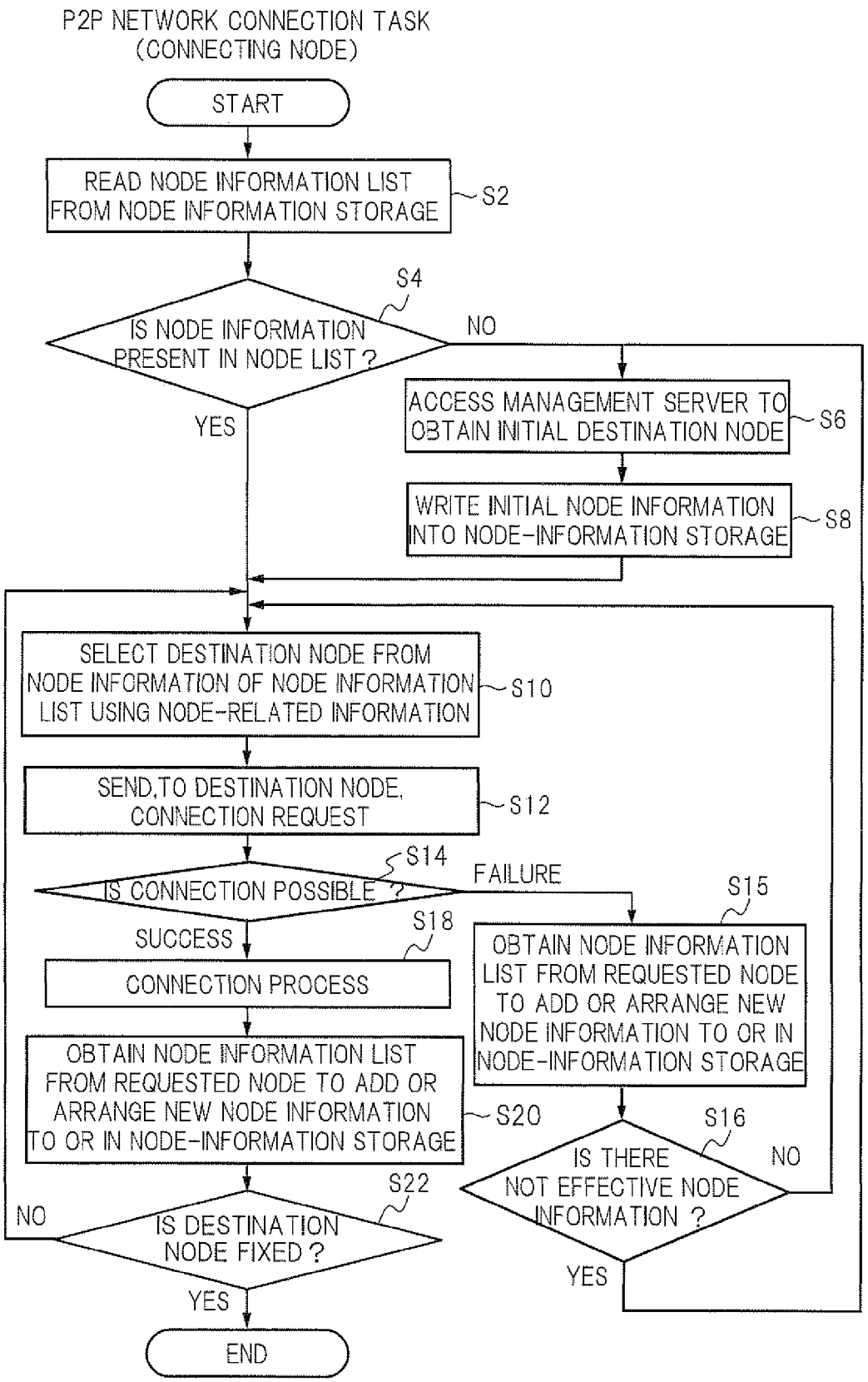

[FIG.10]
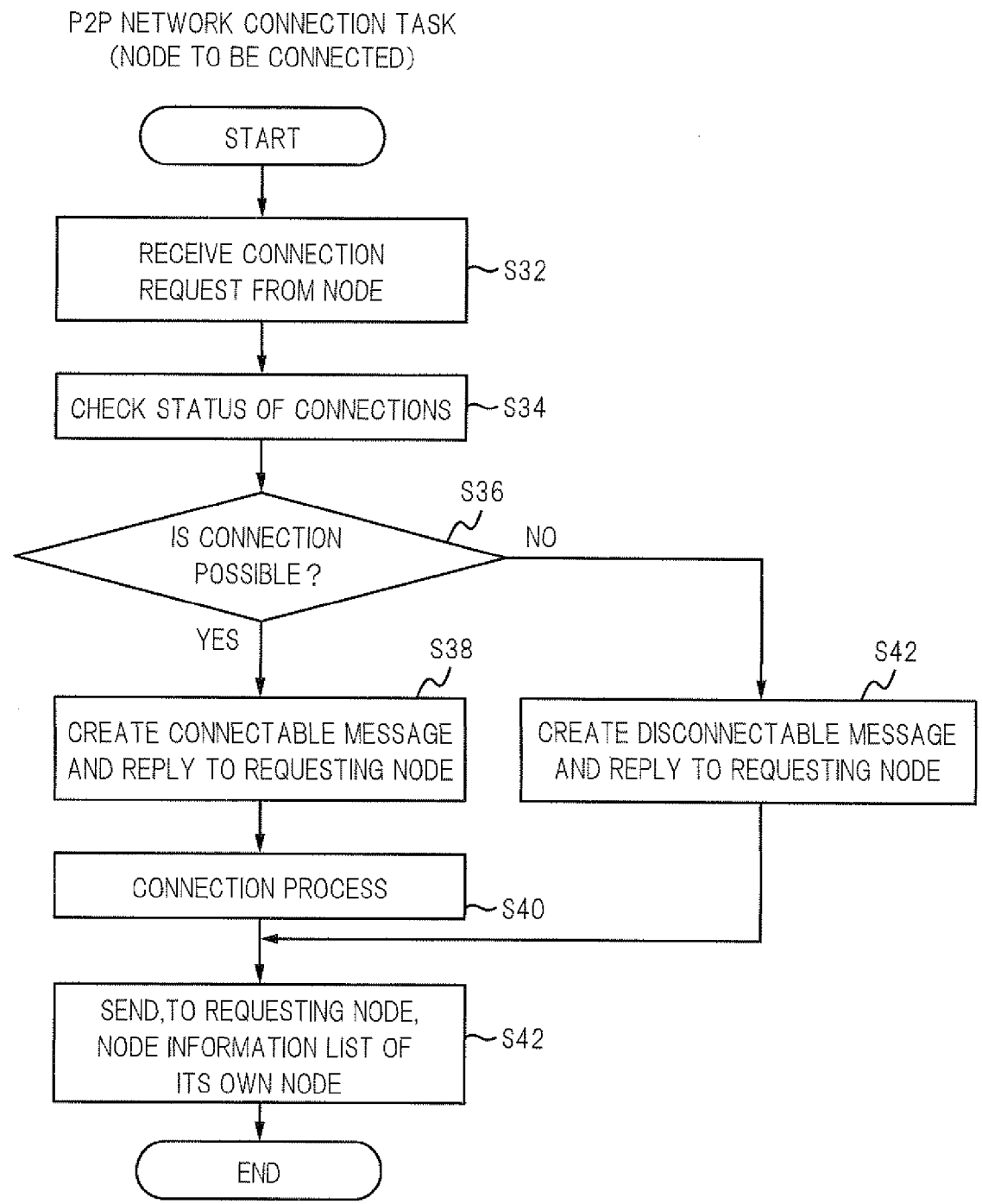

[FIG.11]
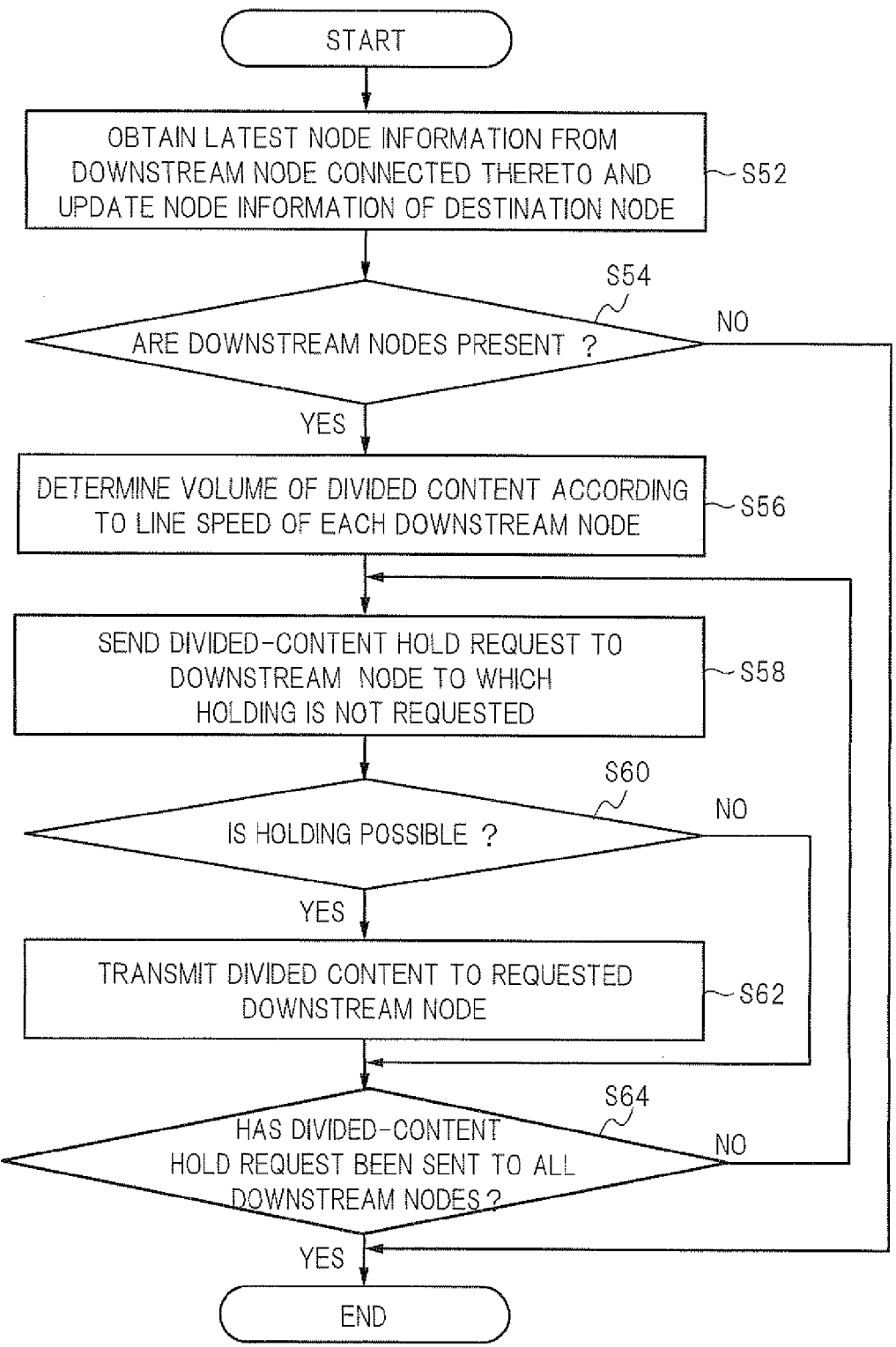

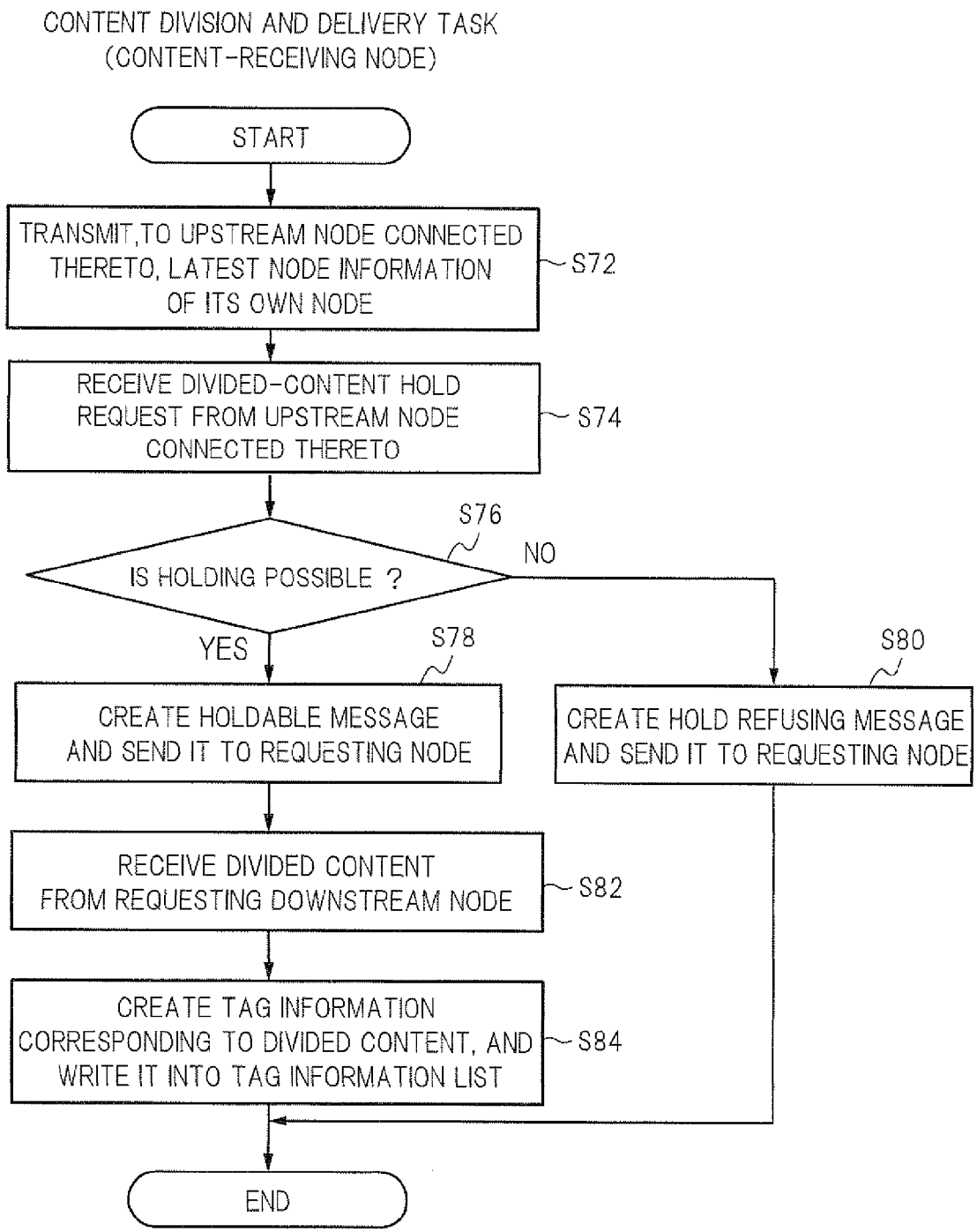

[FIG.13]
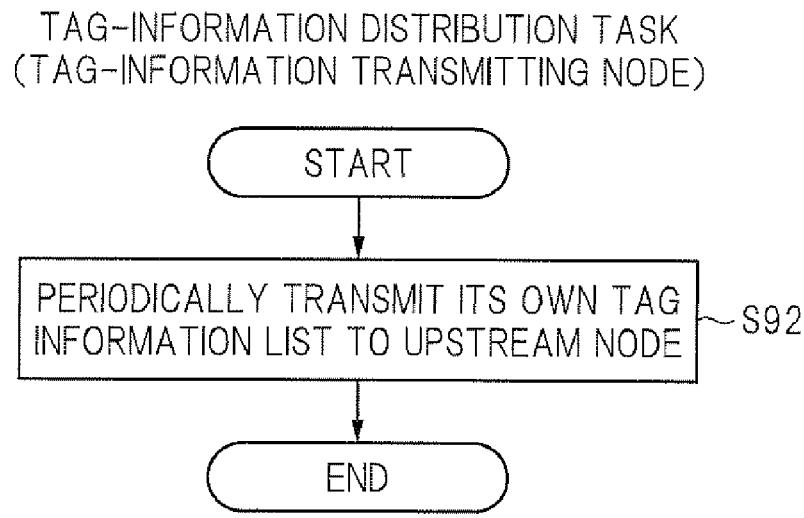
[FIG.14]
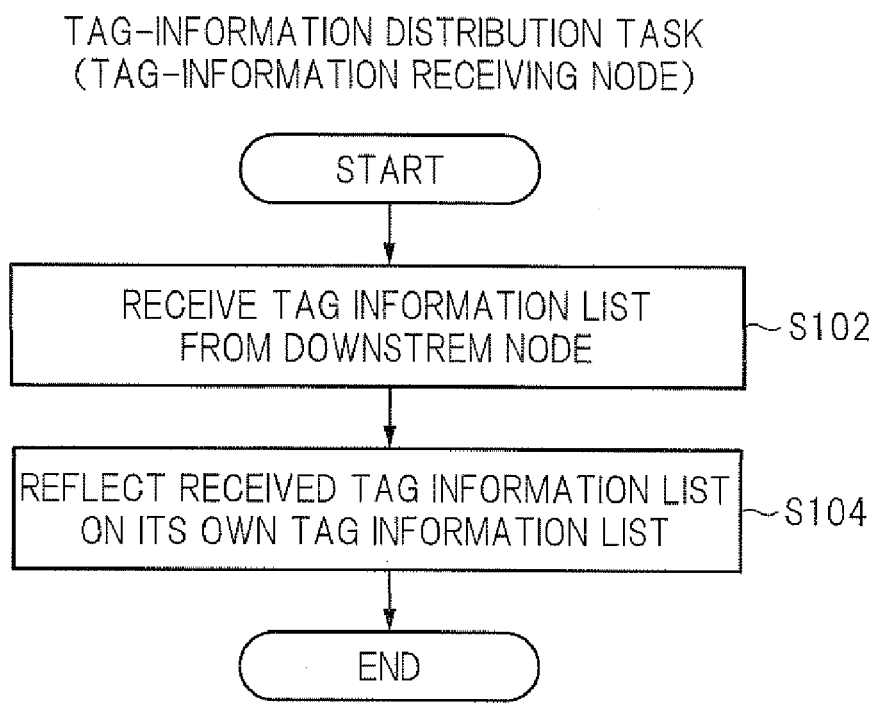

[FIG.15]
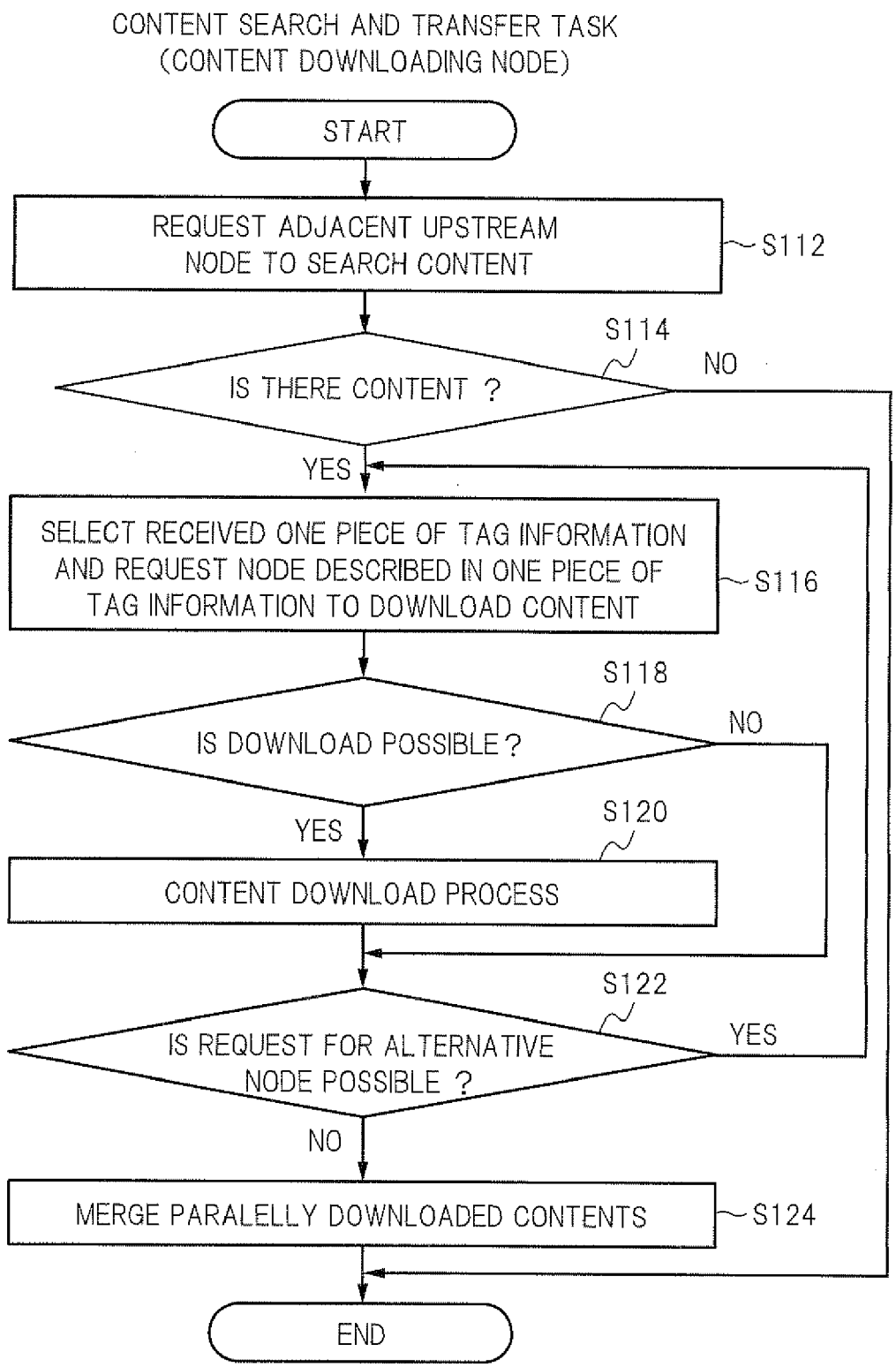

[FIG.16]
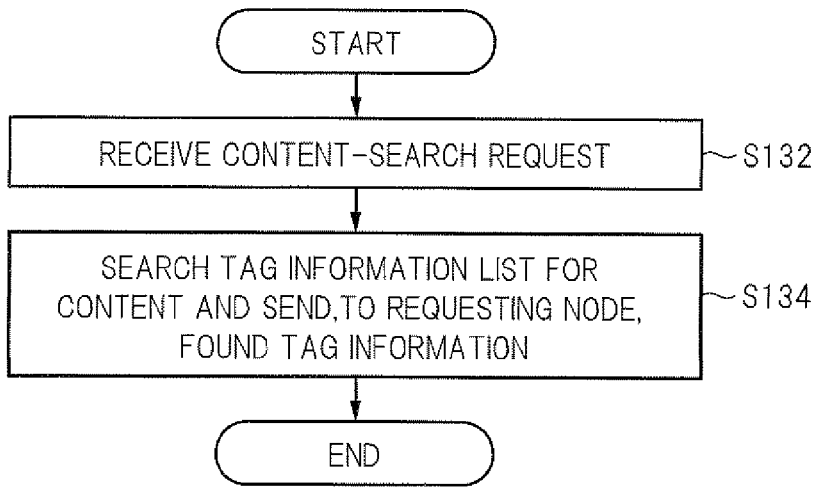
[FIG.17]
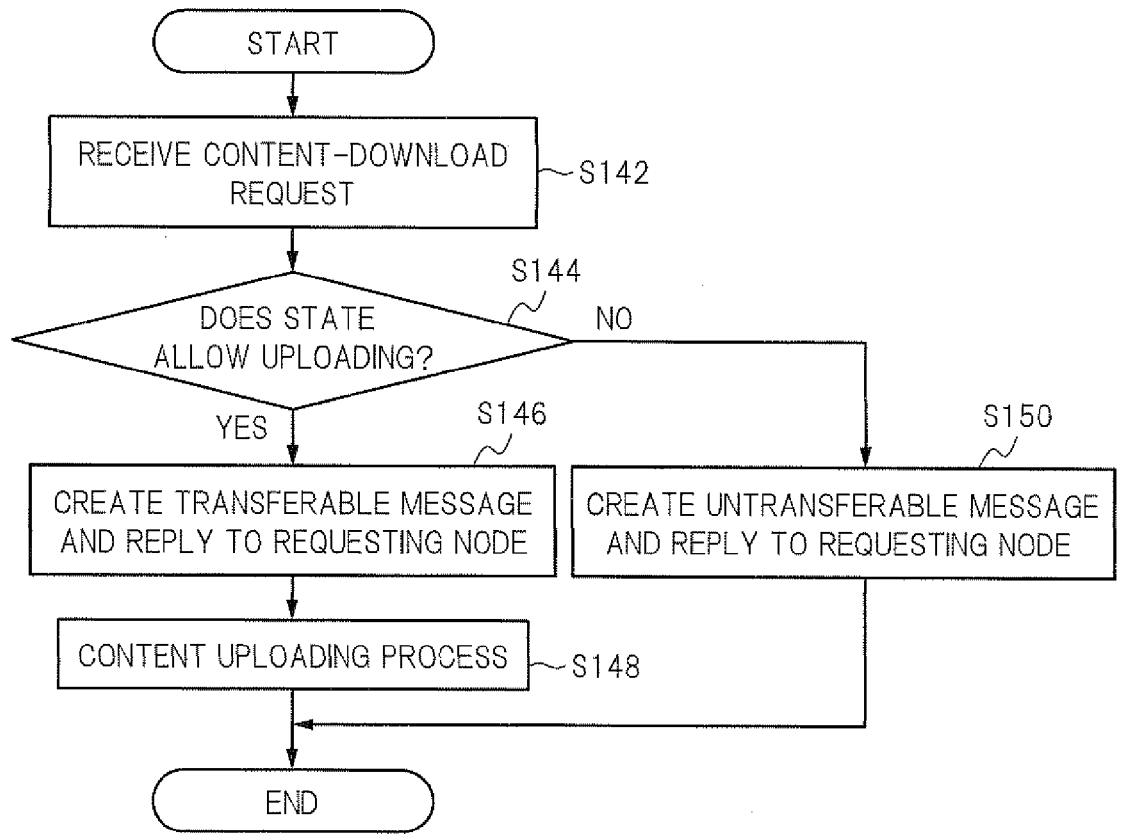

[FIG.18]
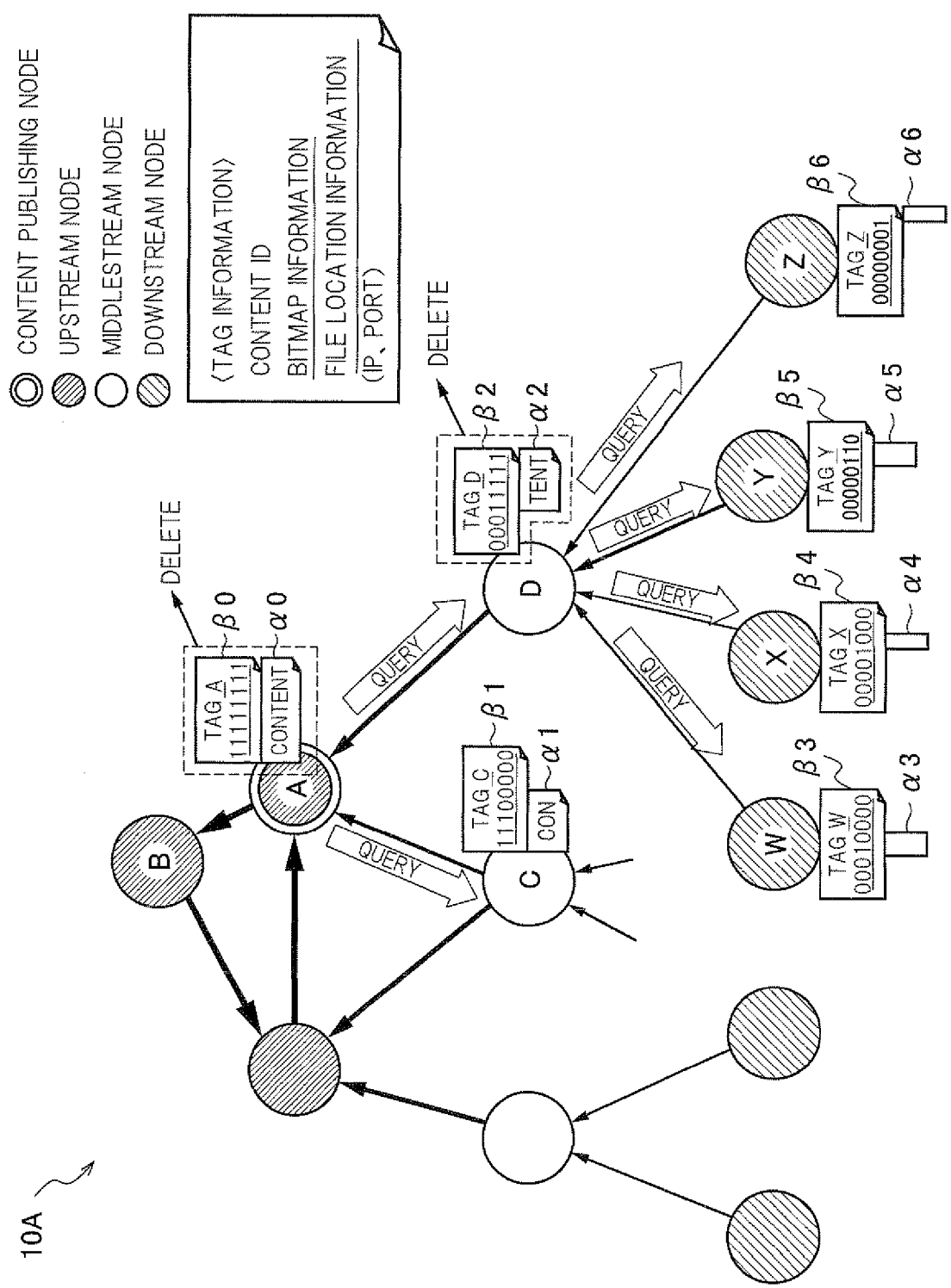

[FIG.19]
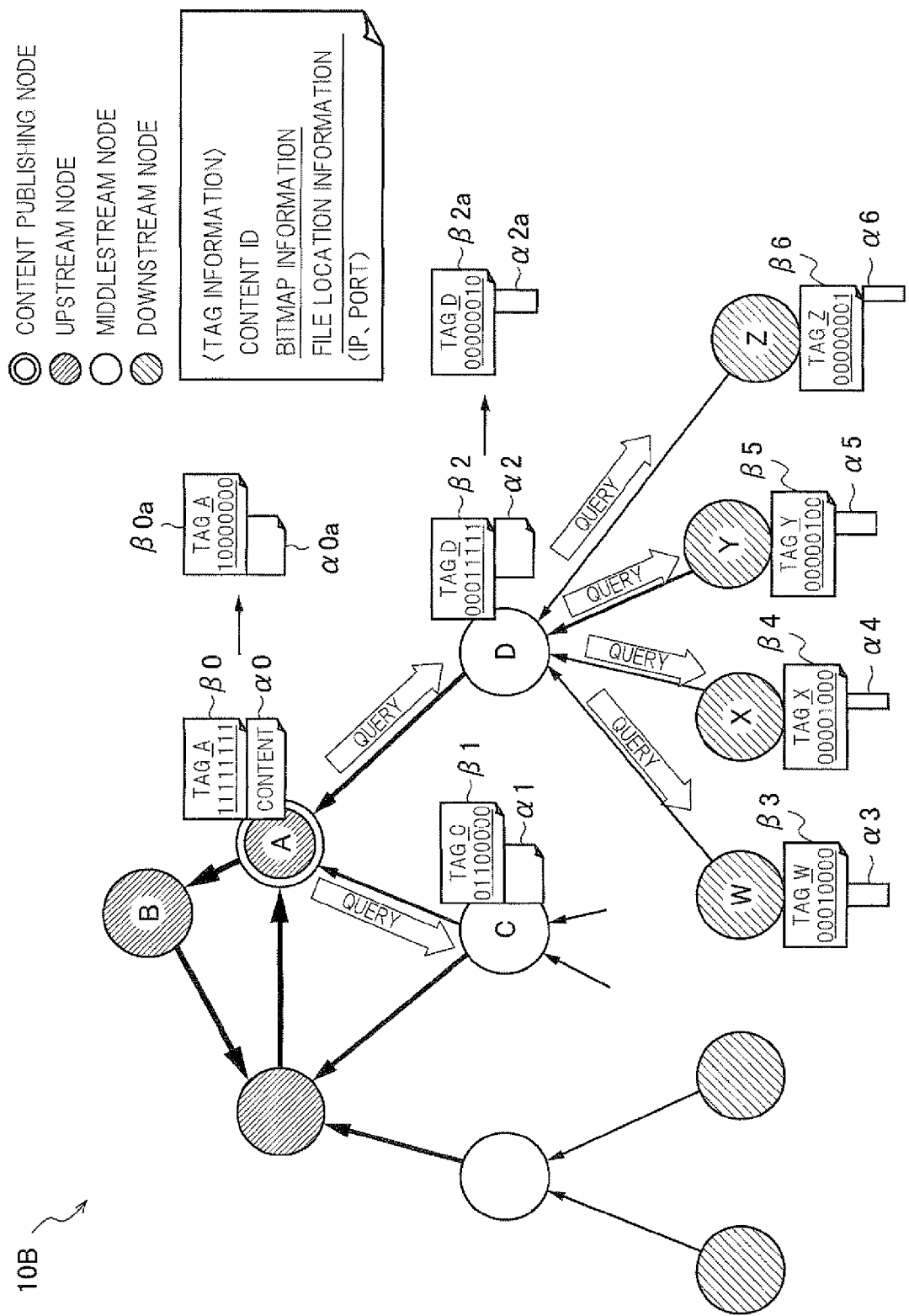

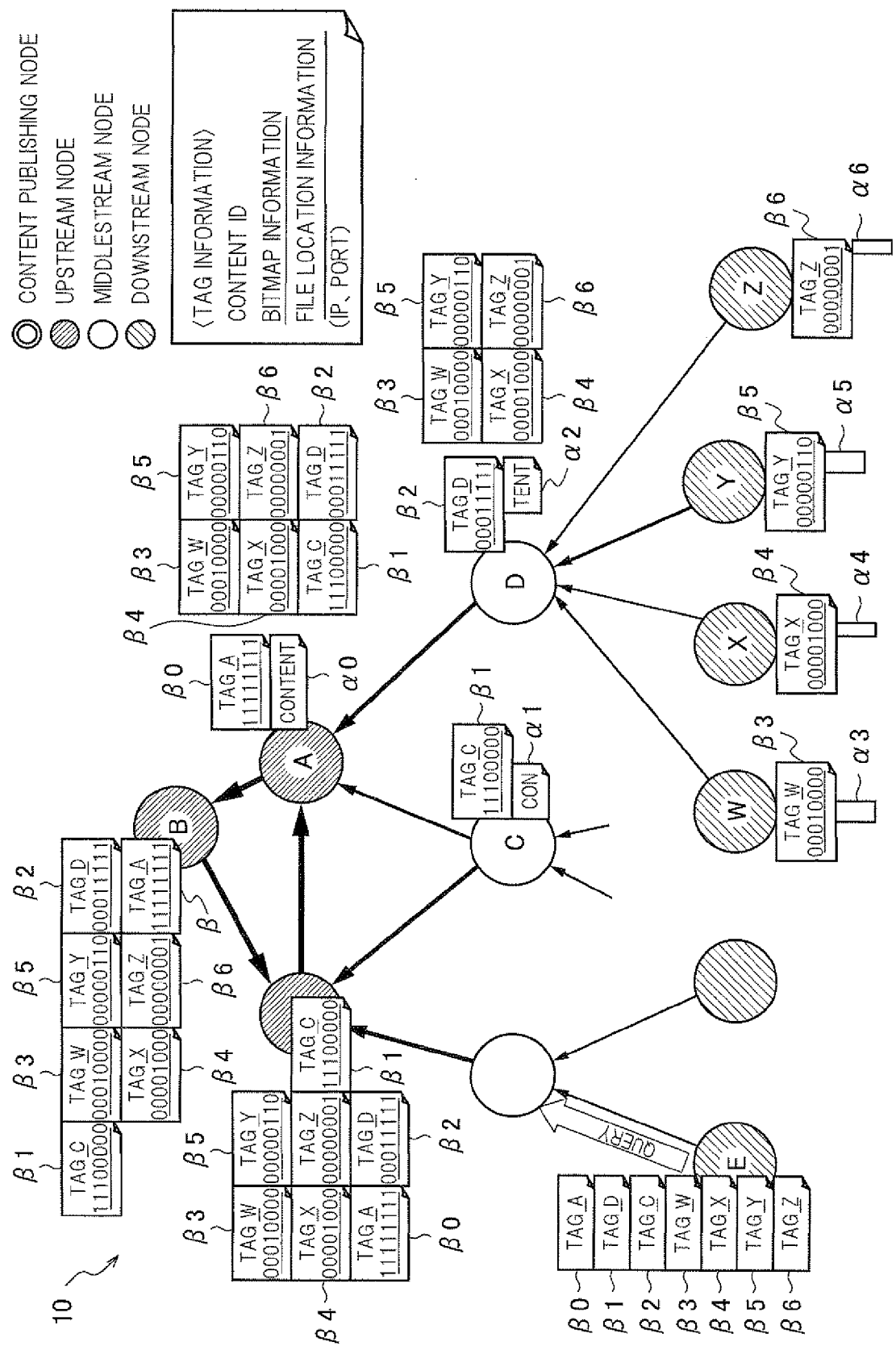
[FIG.20]

[FIG.21]
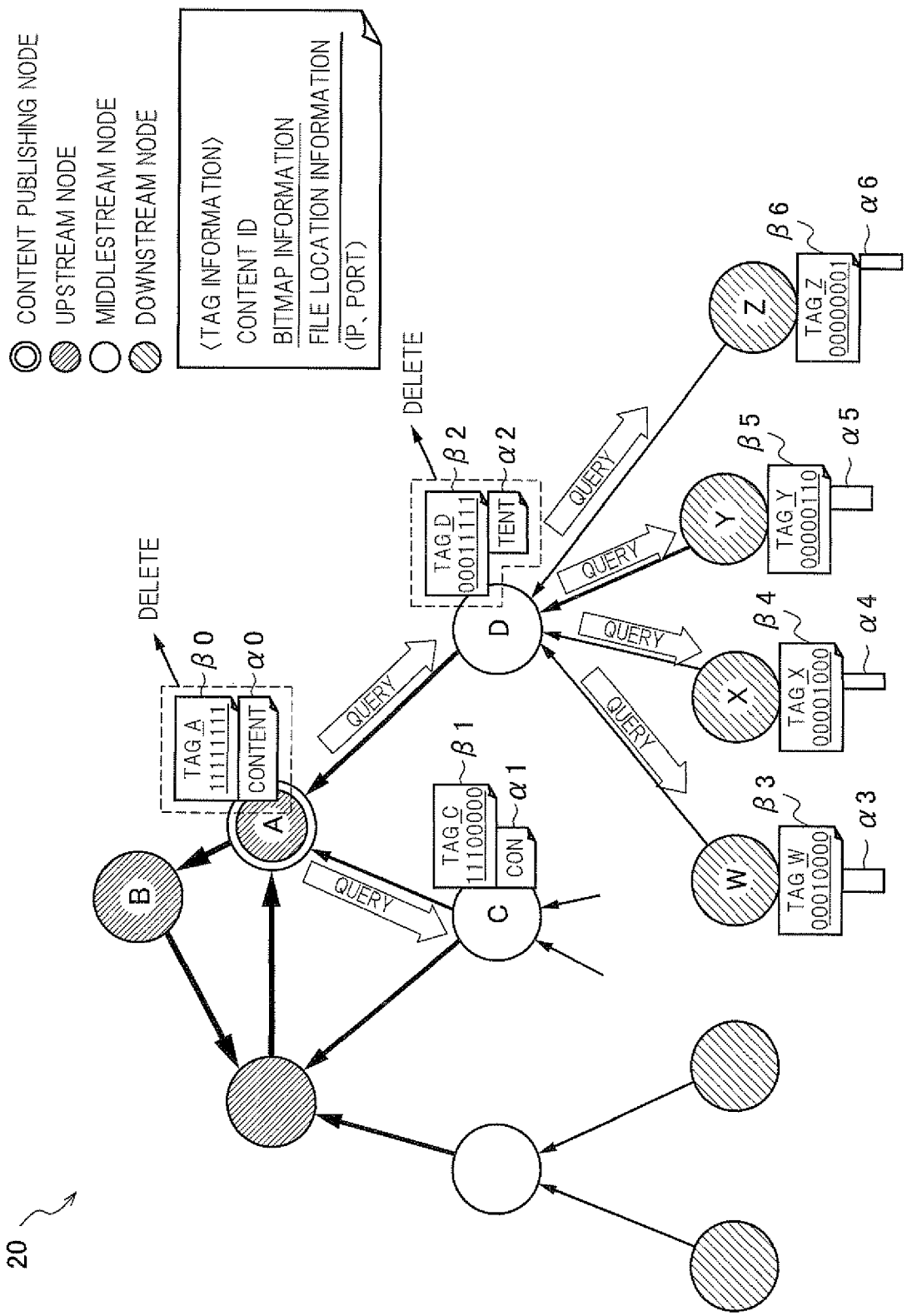

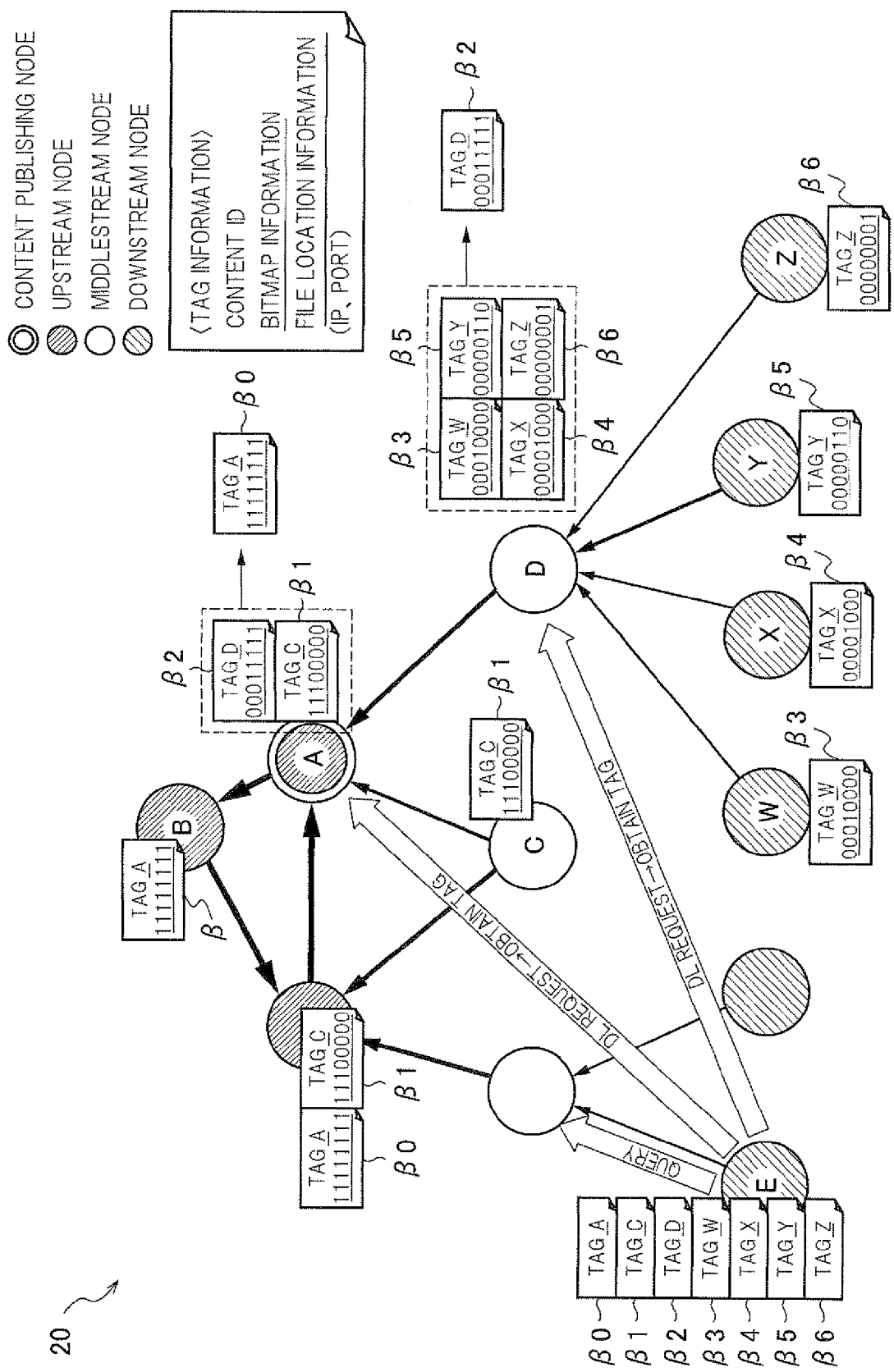
[FIG.22]

[FIG.23]
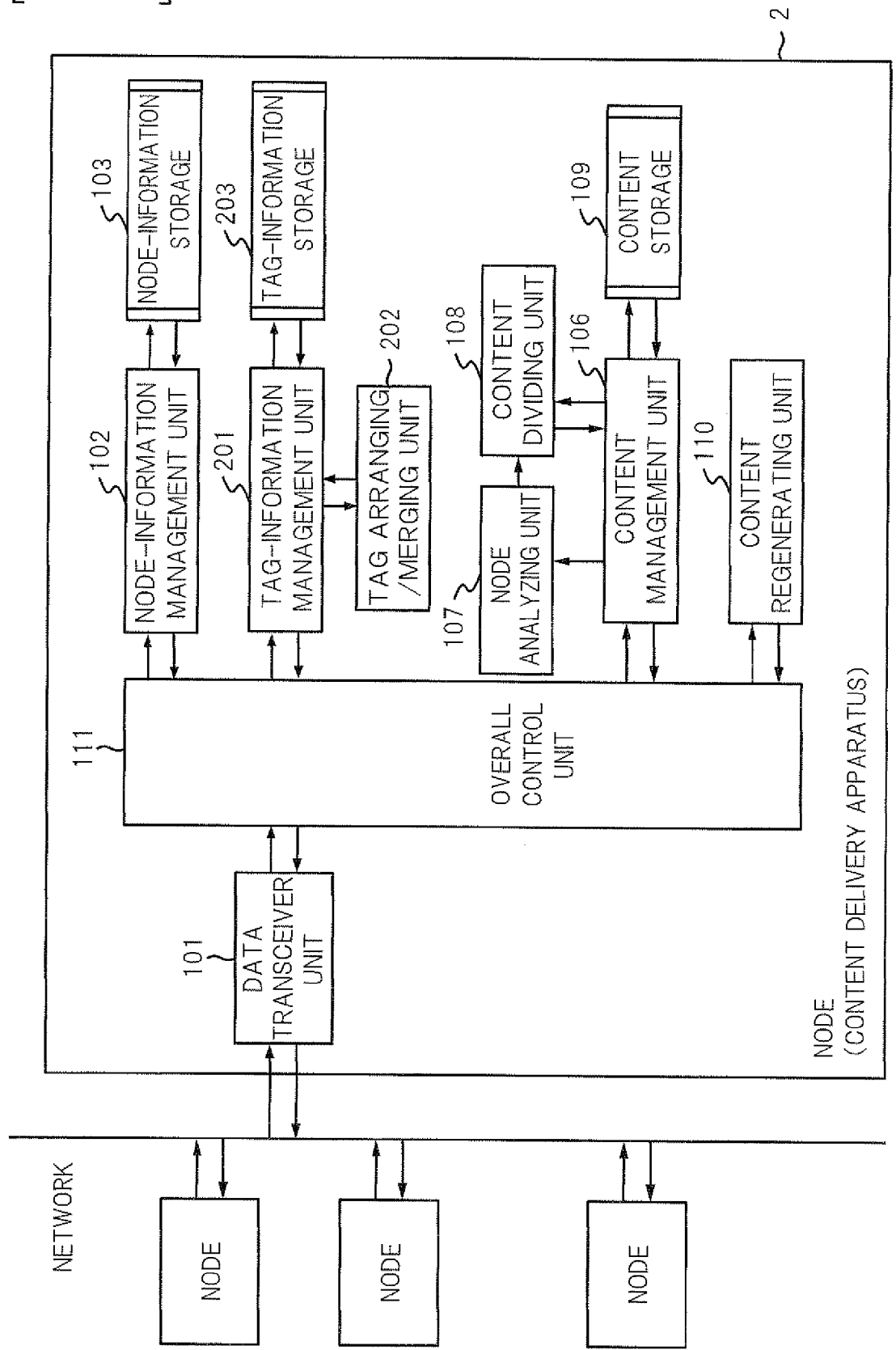

[FIG.24]
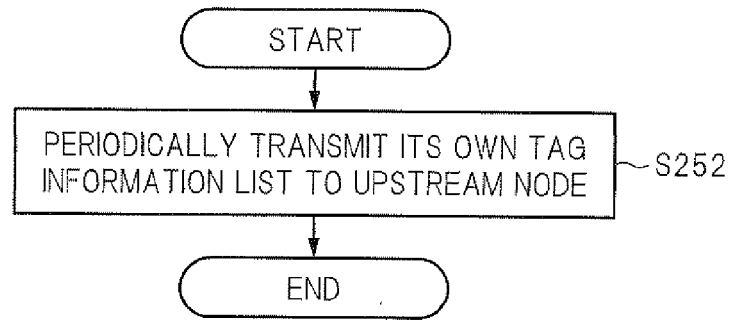
[FIG.25]
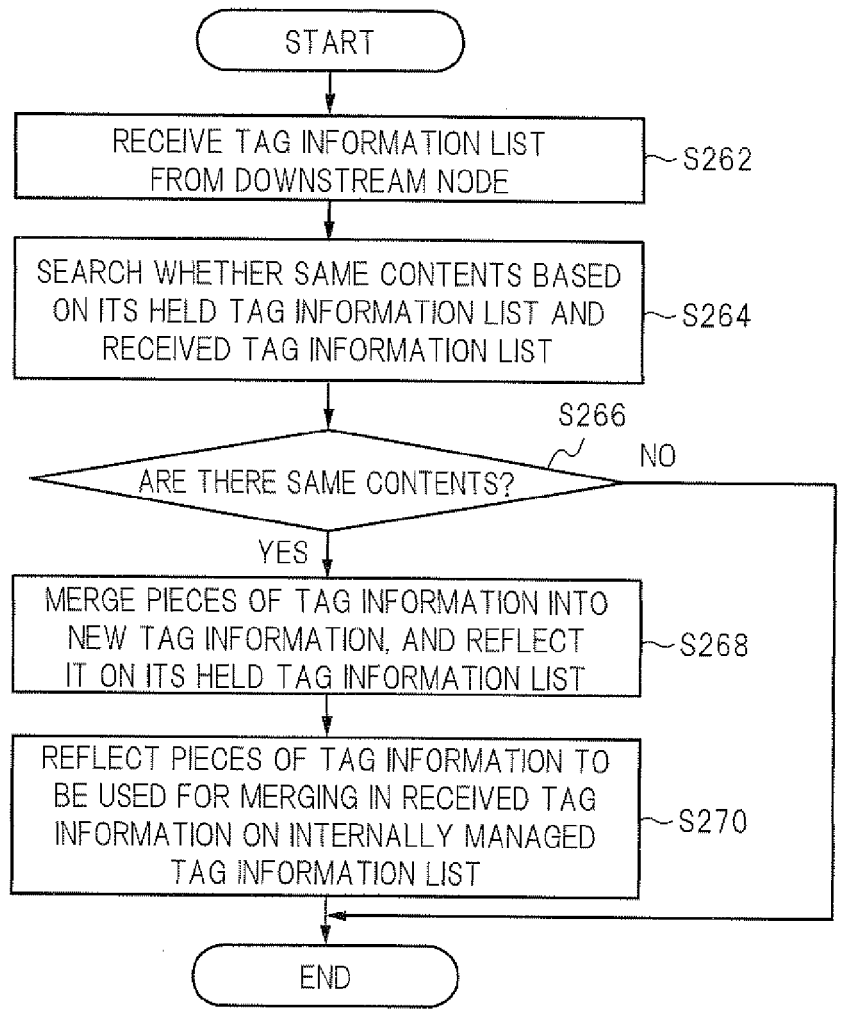

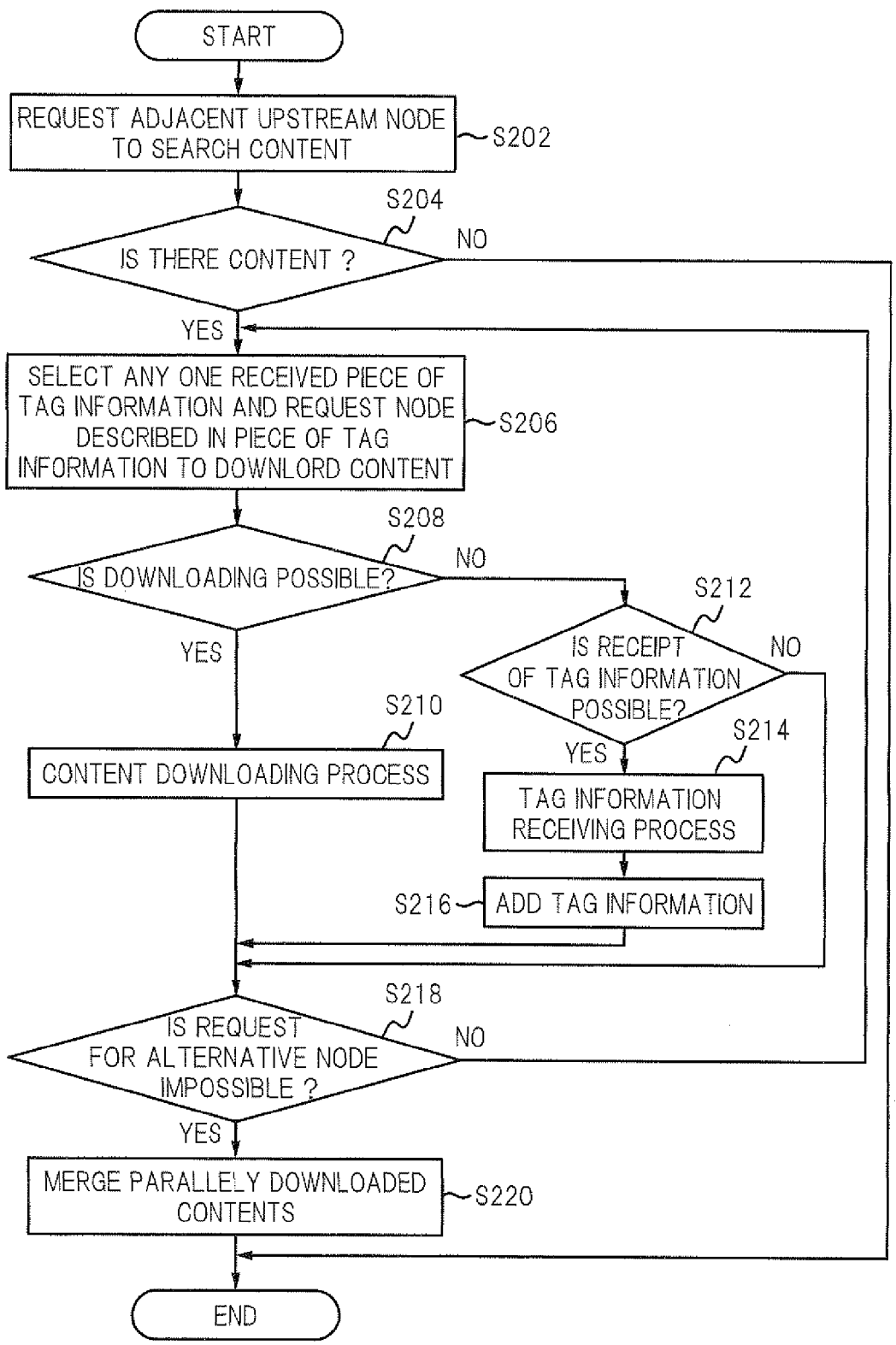
[FIG.26]

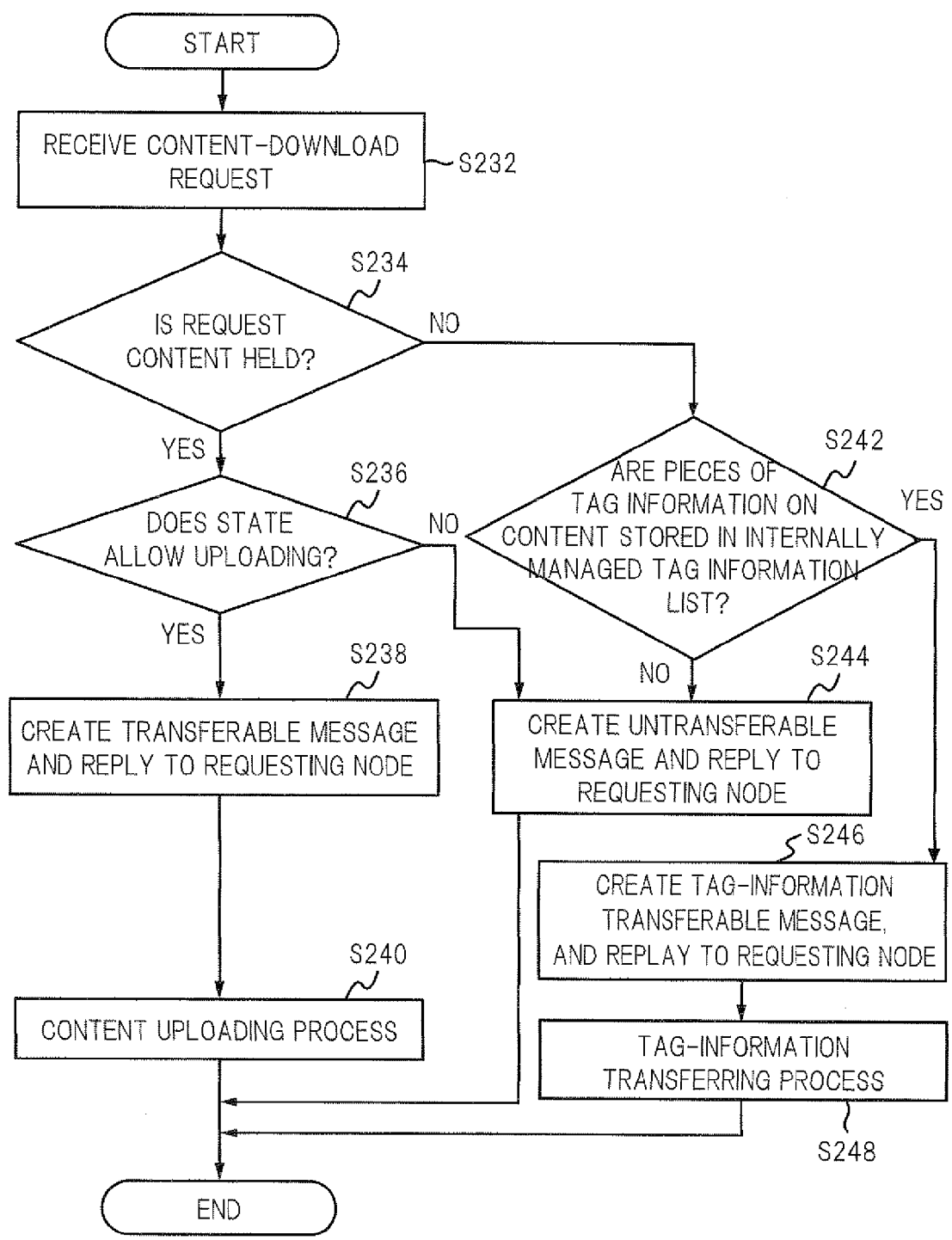

CONTENT DELIVERY APPARATUS, CONTENT DELIVERY METHOD, AND CONTENT DELIVERY PROGRAM

This application is the U.S. National Phase of International Application No. PCT/JP2007/056915, filed 29 Mar. 2007, which designated the U.S., the entire contents of which are hereby incorporated by reference.

TECHNICAL FIELD OF THE INVENTION

The present invention relates to technologies for delivering contents in P2P (Pear to Pear) networks, more particularly to content delivery apparatuses, content delivery methods, and content delivery programs in such P2P networks.

BACKGROUND ART

As data delivery configurations via communication networks, configurations referred to as "P2P" have been recently widespread, In conventional content deliveries, users download files from servers managed by their carriers or the like. However, in P2P content distributions, no servers that collectively store therein digital contents are provided, and users can exchange their digital contents stored their personal computers therebetween.

FIG. 1 illustrates a P2P network 90 that includes some nodes (computers), ranked as upstream nodes, connected to high communication networks and alternative some nodes (computers), ranked as downstream nodes, connected to low communication networks. The P2P network 90 is configured such that contents and their index information are more gathered in the upstream nodes to thereby enhance the content-search efficiency or the content-delivery efficiency (FIG. 1 is a schematic view, and many layered networks may be provided downstream of the downstream nodes or upstream of the upstream nodes, or a two-layered network of upstream and downstream may be provided).

In the P2P network 90 illustrated in FIG. 1, when a node for retrieving a content gives a query command to an upstream node adjacent thereto, the upstream node is adapted to search its managed content list for the requested content; this content list includes collected index information on contents). The upstream node is adapted to give, to downstream nodes, the locations of nodes, as an answer; these nodes disclose the requested content. When the requested content is not included in its managed content list, the upstream node gives the query command to a higher upstream node or a coordinate upstream node.

When receiving a result of the search from the upstream node, the downstream node connects to a node described in the answer to download the content.

For example, P2P file sharing software of Winny that forms the P2P network 90 generates tag information associated with contents in order to distribute the contents; this tag information for a content describes the location of a node storing the content (IP address, port number; hereinafter referred to as file location information). The Winny distributes the tag information to upstream nodes adjacent thereto.

When receiving the tag information, an upstream node distributes the tag information to a higher upstream node or a coordinate upstream node. This allows many pieces of tag information to be collected upstream, so that upstream nodes are adapted to manage the tag information lists, that is, the content lists.

In the P2P network 90 formed by the Winny, many pieces of tag information are more stored in the upstream nodes.

In addition, in the Winny, during the distribution of tag information, the tag information (file location information) is updated with a fixed probability. For this reason, when receiving the updated tag information and trying to download a content, a node provides a download request to an upstream node described in the updated tag information. However, because the upstream node does not actually store the content, the upstream node searches its content list, downloads the content from a node that actually stores the content, and uploads the content to the download-request providing node.

This results in that the queried content is downloaded to the source node of query, and the content is also stored in the upstream node that relays the distribution of the content. In the P2P network 90 formed by the Winny, upstream nodes serve as relay nodes of content distributions, and, therefore, store many published contents (nodes that have downloaded contents serve as content-publishing nodes).

These will be specifically described with reference to FIGS. 1 and 2.

FIG. 1 illustrates a situation in which a node S has opened a content $\alpha 0$, and a node B tries to download the content $\alpha 0$. As illustrated in FIG. 1, tag information $\beta 0$ on the content $\alpha 0$ indicative of the node S holding the content $\alpha 0$ is distributed to upstream nodes located more upstream relative to the node S.

First, the node B transmits a query for the content $\alpha 0$ to an upstream node D adjacent thereto. When receiving the query for the content $\alpha 0$, the node D returns the tag information $\beta 0$ to the node B because it holds, in its content list, the tag information $\beta 0$ indicative of the location of the content $\alpha 0$.

This results in that the node B finds the location of the node S that has published the content $\alpha 0$ from the received tag information $\beta 0$, directly establishes a P2P connection to the node S, and downloads the content $\alpha 0$.

Moreover, FIG. 2 illustrates a situation in which a node S has opened content $\alpha 0$, and a node C tries to download the contents $\alpha 0$. As illustrated in FIG. 2, the tag information $\beta 0$ on the content $\alpha 0$ indicative of the node S holding the content $\alpha 0$ is distributed to upstream nodes located more upstream relative to the node S. In addition, the tag information $\beta 0$ is updated in an upstream node so that the tag information $\beta 0$ is changed to tag information $\beta 0a$ indicative of a node A holding the content $\alpha 0$.

First, the node C transmits a query for the content $\alpha 0$ to an upstream node E adjacent thereto. When receiving the query for the content $\alpha 0$, the node E queries the node A located adjacently upstream relative thereto because it holds, in its content list, no tag information indicative of the location of the content $\alpha 0$.

Because holding, in its content list, the tag information $\beta 0a$ indicative of the location of the content $\alpha 0$, the content A returns the tag information $\beta 0$ to the node C via the node E.

This results in that the node C finds the location of the node A that has published the content $\alpha 0$ from the received tag information $\beta 0a$, directly establishes a P2P connection to the node S, and requests it to download the content $\alpha 0$. However, because the node A does not actually hold the content $\alpha 0$, it downloads the content $\alpha 0$ from the node S that actually holds the content $\alpha 0$, and uploads the content $\alpha 0$ to the node C. As a result, the content $\alpha 0$ is transferred to be located in both the node C and the node A, making it possible to improve the efficiency of distributions of contents.

First patent document: Japanese Patent Laid-Open No. 2006-178782

Non-patent document: The technology of Winny, Isamu Kaneko, ASCII, October, 2005

DISCLOSURE OF THE INVENTION

Problems to be Solved by the Invention

In the aforementioned P2P network 90, many contents and many pieces of tag information are more gathered in the upstream nodes. This may place a great burden of managing the contents on the upstream nodes. Of course, the P2P network 90 is a network to collect contents and their index information to more upstream nodes to thereby enhance the content-search efficiency or the content-delivery efficiency. If the downstream nodes could have an appropriate burden, it would be possible to make the entire P2P network more efficient.

The present invention has been made in view of the aforementioned circumstances, and has an example of a purpose of providing content delivery apparatuses, content delivery methods, and content delivery program in a P2P network in which:

nodes are defined as upstream and downstream nodes according to speeds of lines connected thereto; and node-to-node content deliveries are carried out using tag information indicative of information on files of contents or the locations of the contents;

these apparatuses, methods, and programs are capable of reducing a burden on the upstream node to thereby make the entire P2P network more efficient.

Means for Solving the Problems

In order to achieve such a purpose provided above, a content delivery apparatus constituting each node of a P2P network recited in claim 1, the P2P network that:

defines, as a downstream node, a sender node for transmitting, to an adjacent node, tag information indicative of locations of holding nodes that hold delivery target contents and information of the holding nodes;

defines, as an upstream node, a destination node for receiving the tag information; and gathers the tag information more in the upstream node to increase content-search efficiency or content-delivery efficiency, the content delivery apparatus including:

a tag information storage means that stores tag information of a delivery target content held in its own node and tag information received from each downstream node adjacent to its own node;

a tag information merging means that, when there is a plurality of divided pieces of tag information for divided contents created by dividing the same content or a plurality of divided pieces of tag information for divided contents created by dividing, in contents, a group of a plurality of contents in the tag information stored in the tag information storage means, merges the plurality of divided pieces of tag information into merged tag information, and stores the merged tag information in the tag information storage means and in an internal tag information storage means that internally manages the plurality of merged pieces of tag information; and a tag information distributing means that transmits the merged tag information to an upstream node adjacent to its own node.

A content delivery apparatus constituting each node of a P2P network recited in claim 10, the P2P network that:

the P2P network that:

defines, as an upstream node, a node connected to a communication network higher than that to which its own node is connected;

defines as a downstream node, a node connected to a communication network lower than that to which its own node is connected; and gathers delivery target contents and the tag information more in the upstream node to increase content-search efficiency or content-delivery efficiency, the tag information representing locations of holding nodes that hold the delivery target contents and information of the holding nodes, the content delivery apparatus including:

a downstream-node situation obtaining means that obtains information on each downstream node adjacent to its own node;

a content dividing means that determines, based on the obtained situation of each downstream node, a volume of a divided content to be delivered to each downstream node, and divides the delivery target content held in its own node according to the determined volume for each downstream node;

a divided-content distributing means that distributes each divided content by the content dividing means to a corresponding one of the downstream nodes adjacent to its own node;

a tag information storage means that stores tag information of a delivery target content held in its own node and tag information received from each downstream node adjacent to its own node;

a tag information merging means that, when there is a plurality of divided pieces of tag information for divided contents created by dividing the same content or a plurality of divided pieces of tag information for divided contents created by dividing, in contents, a group of a plurality of contents in the tag information stored in the tag information storage means, merges the plurality of divided pieces of tag information into new tag information, stores the new tag information in the tag information storage means, deletes the plurality of merged pieces of tag information from the tag information storage means, and stores the plurality of merged pieces of tag information in an internal tag information storage means that internally manages tag information;

a tag information distributing means that transmits the merged tag information to an upstream node adjacent to its own node;

a content searching means that:

searches the tag information storage means when receiving the content-search request from each downstream node adjacent to its own node, when there is a content corresponding to the content-search request, transmits, to the search requesting node, tag information on the content, and when there is not a content corresponding to the content-search request, further transmits, to the upstream node adjacent to its own node;

a content receiving means that accesses, based on the locations, received as a result of the search, of the holding nodes of the plurality of pieces of tag information to request downloading, and that parallely downloads the divided contents from the holding nodes, respectively;

a content merging means that merges the downloaded divided contents into an original content; and a content transmitting means that uploads the delivery target content held in its own node to a download-requesting node.

A content delivery method in a P2P network recited in claim 11, the P2P network that:

defines, as a downstream node, a sender node for transmitting, to an adjacent node, tag information indicative of locations of holding nodes that hold delivery target contents and information of the holding nodes;

defines, as an upstream node, a destination node for receiving the tag information; and gathers the tag information more in the upstream node to increase content-search efficiency or content-delivery efficiency, the content delivery method including:

a tag information storing step of storing, in a tag information storage means, tag information of a delivery target content held in its own node and tag information received from each downstream node adjacent to its own node;

a tag information merging step of, when there is a plurality of divided pieces of tag information for divided contents created by dividing the same content or a plurality of divided pieces of tag information for divided contents created by dividing, in contents, a group of a plurality of contents in the tag information stored in the tag information storage means, merging the plurality of divided pieces of tag information into merged tag information, and storing the merged tag information in the tag information storage means and in an internal tag information storage means that internally manages the plurality of merged pieces of tag information; and a tag information distributing step of transmitting the merged tag information to an upstream node adjacent to its own node.

A content delivery program readable by each node of a P2P network recited in claim 12, the P2P network that:

defines, as a downstream node, a sender node for transmitting, to an adjacent node, tag information indicative of locations of holding nodes that hold delivery target contents and information of the holding nodes;

defines, as an upstream node, a destination node for receiving the tag information; and gathers the tag information more in the upstream node to increase content-search efficiency or content-delivery efficiency, the content delivery program causing the node to function as:

a tag information storage means that stores tag information of a delivery target content held in its own node and tag information received from each downstream node adjacent to its own node;

a tag information merging means that, when there is a plurality of divided pieces of tag information for divided contents created by dividing the same content or a plurality of divided pieces of tag information for divided contents created by dividing, in contents, a group of a plurality of contents in the tag information stored in the tag information storage means, merges the plurality of divided pieces of tag information into merged tag information, and stores the merged tag information in the tag information storage means and in an internal tag information storage means that internally manages the plurality of merged pieces of tag information; and a tag information distributing means that transmits the merged tag information to an upstream node adjacent to its own node.

BRIEF DESCRIPTION OF THE DRAWINGS

FIG. 1 is a P2P network schematically indicative of a conventional content delivery method;

FIG. 2 is a P2P network schematically indicative of a conventional content delivery method;

FIG. 3 is a P2P network schematically indicative of a content delivery method according to a first embodiment of the present invention;

FIG. 4 is the P2P network schematically indicative of the content delivery method according to the first embodiment of the present invention;

FIG. 5 is a view illustrating data formats of a content and tag information to be delivered in the P2P network according to the first embodiment of the present invention;

FIG. 6 is a view illustrating a data format of node information to be used in the P2P network according to the first embodiment of the present invention;

FIG. 7 specifically illustrates an example of data formats of divided contents and their pieces of tag information obtained when one content is divided into the divided contents;

FIG. 8 is a schematic structural view of a content delivery apparatus according to the first embodiment of the present invention;

FIG. 9 is a flowchart illustrating a P2P network connection task in the content delivery apparatus (connecting node) according to the first embodiment of the present invention;

FIG. 10 is a flowchart illustrating the P2P network connection task in the content delivery apparatus (node to be connected) according to the first embodiment of the present invention;

FIG. 11 is a flowchart illustrating a content division and delivery task in the content delivery apparatus (content transmitting node) according to the first embodiment of the present invention;

FIG. 12 is a flowchart illustrating the content division and delivery task in the content delivery apparatus (content receiving node) according to the first embodiment of the present invention;

FIG. 13 is a flowchart illustrating a tag-information distribution task in the content delivery apparatus (tag-information transmitting node) according to the first embodiment of the present invention;

FIG. 14 is a flowchart illustrating the tag-information distribution task in the content delivery apparatus (tag-information receiving node) according to the first embodiment of the present invention;

FIG. 15 is a flowchart illustrating a content search and transfer task in the content delivery apparatus (content downloading node) according to the first embodiment of the present invention;

FIG. 16 is a flowchart illustrating the content search and transfer task in the content delivery apparatus (content searching node) according to the first embodiment of the present invention;

FIG. 17 is a flowchart illustrating the content search and transfer task in the content delivery apparatus (content uploading node) according to the first embodiment of the present invention;

FIG. 18 is a P2P network schematically indicative of a content delivery method according to a modification of the first embodiment of the present invention;

FIG. 19 is a P2P network schematically indicative of a content delivery method according to another modification of the first embodiment of the present invention;

FIG. 20 is a P2P network schematically representing the content delivery method according to the first embodiment of the present invention;

FIG. 21 is a P2P network schematically indicative of a content delivery method according to a second embodiment of the present invention;

FIG. 22 is the P2P network schematically indicative of the content delivery method according to the second embodiment of the present invention;

FIG. 23 is a schematic structural view of a content delivery apparatus according to the second embodiment of the present invention.

FIG. 24 is a flowchart illustrating a tag-information distribution task in the content delivery apparatus (tag-information transmitting node) according to the second embodiment of the present invention;

FIG. 25 is a flowchart illustrating the tag-information distribution task in the content delivery apparatus (tag-information receiving node) according to the second embodiment of the present invention;

FIG. 26 is a flowchart illustrating a content search and transfer task in the content delivery apparatus (content downloading node) according to the second embodiment of the present invention; and FIG. 27 is a flowchart illustrating the content search and transfer task in the content delivery apparatus (content uploading node) according to the second embodiment of the present invention.

DESCRIPTION OF CHARACTERS

| | |
|---|---|
| α, α0, α1, α2, α3, α4, α5, α6 | Content |
| β, β0, β1, β2, β3, β4, β5, β6 | Tag information |
| γ | Node information |
| 1 | Node (Content delivery apparatus) |
| 101 | Data transceiver unit |
| 102 | Node-information management unit |
| 103 | Node-information storage |
| 104, 201 | Tag-information management unit |
| 105, 203 | Tag-information storage |
| 106 | Content management unit |
| 107 | Node analyzing unit |
| 108 | Content dividing unit |
| 109 | Content storage |
| 110 | Content regenerating unit |
| 111 | Overall control unit |
| 202 | Tag arranging/merging unit |

BEST MODES FOR CARRYING OUT THE INVENTION

Embodiments of the present invention will be described hereinafter with reference to the drawings.

First Embodiment

<Content Delivery Method>

FIG. 3 illustrates a P2P network 10 that schematically represents a content delivery method according to a first embodiment of the present invention. Note that the P2P network 10 is a network in which:

nodes are defined, according to speeds (specifically, upstream speeds) of lines connected to the nodes, as upstream and downstream nodes (relationships between the upstream and downstream are relative relationships between nodes and another node connected to the nodes; and tag information indicative of information on files of contents or the locations of the contents are distributed so that the contents are delivered among the nodes.

One example of the P2P network is a P2P network formed by computes, as nodes, each installed with P2P file sharing software, such as Winny. In other words, the P2P network 10 is configured such that:

nodes connected to high communication networks are defined as upstream nodes;

nodes connected to low communication networks are defined as downstream nodes; and contents and their index information are more gathered in the upstream nodes to thereby enhance the content-search efficiency or the content-delivery efficiency.

Note that the content delivery method according to this embodiment can be implemented by installing a content delivery program according to this embodiment of the present invention into each node (referred to as content delivery apparatus hereinafter).

The content delivery program according to this embodiment includes, in addition to functions provided in the Winny, a content division and delivery function of dividing public contents (delivery target contents) and delivering the divided public contents to downstream nodes.

The content delivery method according to this embodiment is a method in which content-publishing nodes divide a publish content according to the situations of downstream nodes adjacent thereto, and cause the adjacent downstream nodes to hold divided publish contents. This method causes the downstream nodes, in addition to the upstream nodes, to be responsible for a part of content-deliveries to thereby effectively use the downstream nodes.

Note that the situation of a downstream node means, for example, the speed of a line to which the downstream node is connected. A downstream node is adapted to hold, by itself, a divided content the volume of which depends on the line speed (the lower the line speed to which a downstream node is connected is, the more the volume to be held is reduced).

When downloading the content, a content searching node downloads the divided contents in parallel from a plurality of downstream nodes that hold the divided contents, thus increasing the speed of the downloading. As described above, the content delivery method according to this embodiment is designed to transfer, to a content searching node, a divided content, the volume of which depends on a band of a communication network to which a downstream node is connected, even if the band is small. For this reason, the content delivery method can effectively use the small network band, thus effectively using downstream nodes.

Specific descriptions will be provided with reference to FIGS. 3 and 4.

For example, when a node A illustrated in FIG. 3 publishes a content α0, the node A sends, to each of nodes C and D downstream of the node A, a content-hold request. The content-hold request requests each of the nodes C and D to hold a volume of the content; this volume meets the situation of a corresponding one of the nodes C and D. For example, in FIG. 3, holding of 3/8 of the content α0 is requested for the node C, and holding of 5/8 thereof is requested for the node D. In this specific example, the content α0 is divided in proportional to the line speed of the node C and that of the node D.

When receiving a reply, from each of the nodes C and D, representing that content-hold request can be carried out, the node A transmits a requested volume of a divided content α1 to the node C, and a requested volume of a divided content α2 to the node D. This results in that the node C holds the divided content α1, creates tag information β1 on the content α1 representing that the node C holds the divided content α1, and delivers the tag information β1 to upstream nodes adjacent thereto. In addition, the node D holds the divided content α2, creates tag information β2 on the content α2 representing that the node D holds the divided content α2, and delivers the tag information β2 to upstream nodes adjacent thereto.

Let us describe reference characters illustrated in FIG. 3. Tag information β0 in the node A represents that the content α0 is present in the node A, and a whole content (an undivided content) is held. "11111111" represents bitmap information. The bitmap information represents that which of eight blocks of divided contents obtained by dividing a content into the eight blocks is held; 1 of the bitmap information represents that a corresponding block is stored, and 0 of the bitmap information represents that no blocks are stored.

The tag information β0 represents that all of eight blocks (a whole content) are held. Similarly, the tag information β1 represents that 3/8 (the first part) of the content α0 is stored in the node C, and the tag information β2 represents that 5/8 (the latter part) of the content α0 is stored in the node D.

Note that a node that has received a divided content and stored it can send, to downstream nodes adjacent thereto, a content-hold request.

For example, the node D illustrated in FIG. 3 is operative to send, to downstream nodes W, X, Y, and Z downstream of the node D, a content-hold request. The content-hold request requests the node W to hold 1/8 of the content α0, the node X to hold 1/8 of the content α0, the node Y to hold 2/8 of the content α0, and the node Z to hold 1/8 of the content α0. Of course, the volume of each of the divided contents is determined depending on the situations (line speeds) of the individual nodes.

When receiving a reply, from each of the nodes W, X, Y, and Z, representing that content-hold request can be carried out, the node D transmits a corresponding requested volume of a divided content to each of the nodes W, X, Y, and Z. This results in that the node W holds a divided content α3, creates tag information β3 on the content α3 representing that the node W holds the divided content α3, and delivers the tag information β3 to upstream nodes adjacent thereto.

Similarly, the node X holds a divided content α4, creates tag information β4 on the content α4 representing that the node X holds the divided content α4, and delivers the tag information β4 to upstream nodes adjacent thereto. Moreover, the node Y holds a divided content α5, creates tag information β5 on the content α5 representing that the node Y holds the divided content α5, and delivers the tag information β5 to upstream nodes adjacent thereto. Furthermore, the node Z holds a divided content α6, creates tag information β6 on the content α6 representing that the node Z holds the divided content α6, and delivers the tag information β6 to upstream nodes adjacent thereto.

The content delivery method according to this embodiment can divide one content over a plurality of layered nodes. For this reason, the original node is subdivided to be distributedly arranged in more downstream nodes; this reduces unevenly distributed contents in the entire P2P network 10.

On the other hand, when trying to download the content α0, a node E illustrated in FIG. 4 sends, to an upstream node adjacent thereto, a search query for the content α0. Thereafter, the node E receives, from the adjacent upstream node, the pieces β1 to β6 of tag information each of which represents the location of a corresponding divided content.

Thus, in accordance with the pieces β1 to β6 of tag information, the node E downloads, from the nodes that store the divided contents of the content α0, the divided contents of the content α0.

In an example illustrated in FIG. 4, the node E simultaneously downloads the divided contents in parallel from the nodes C, W, X, Y, and Z, and thereafter, merges the divided contents into the one content α0. Of course, because the node E can receive the tag information β0, the node E can download an entire content α.

As described above, the content delivery method according to this embodiment simultaneously downloads a plurality of divided contents in parallel from a plurality of downstream nodes, making it possible to effectively use downstream nodes, and speed up downloads.

<Data Configuration>

FIG. 5 illustrates data formats of a content α and tag information β to be delivered in the P2P network 10. Note that, in this embodiment, when a content and tag information corresponding thereto are intended to be expressed as an entire content and tag information corresponding to the entire content, the content and tag information are represented such that 0 is assigned to them, such as a content α0 and tag information β0.

When a content and tag information corresponding thereto are intended to be expressed as a divided content and tag information corresponding to the divided content, the content and tag information are represented such that a natural number is assigned to them, such as a content α1, α2, α3, ..., αN (N is a natural number) and tag information β1, β2, ..., βN (N is a natural number).

When a content and tag information corresponding thereto are intended to mean a general content including an entire content and divided contents and general tag information including tag information corresponding to the entire content and pieces of tag information corresponding to the divided contents, the content and tag information are represented as a content α and tag information β.

Tag information β is index information indicative of the information on a content α and/or the location thereof, and corresponds uniquely to the content α.

Specifically, tag information β consists of:

a content ID for uniquely identifying a corresponding content α (a content ID of an entire content and content IDs of divided contents of the entire content are the same as each other);

bitmap information that is partial information on a divided block (information indicative of which of blocks of divided contents);

content-related information (for example, the title, the performers, the category, thumbnail images, the time, the size, and the supplier of an encryption key of a corresponding content);

a checksum for checking whether divided contents are completely collected; and a content-hold location that is an address of a node in which a content α corresponding to the tag information β is held (IP address, port number).

A content α consists of a content header as header information and content data as an entity of the content. The content header is made up of the content ID, the bitmap information, and the checksum.

FIG. 6 illustrates a data format of node information γ to be used in the P2P network 10. The node information γ is information required for a node to subscribe to the P2P network 10, and specifically, consists of a node ID for uniquely identifying a corresponding node, node-related information (for example, the name, the line speed, the supported languages, the region, the preferences, the registered communities, and the free storage space of a corresponding node), and a node location as an address of a corresponding node (IP address, port number).

FIG. 7 specifically illustrates data formats of divided contents and their pieces of tag information obtained when one content is divided into the divided contents. In FIG. 7, a content α0 stored in a node A (consisting of four blocks) is divided into two divided contents α1 and α2; these divided contents α1 and α2 are stored in a node S and a node T, respectively.

Tag information β1 represents that the node S holds the divided content α1 consisting of three blocks (blocks 1, 2, and 3), and the tag information β2 represents that the node S holds the divided content α2 consisting of one block (block 4).

<Configuration of Content Delivery Apparatus>

FIG. 8 is a schematic structural view of a node (content delivery apparatus) 1 in the P2P network 10. The content delivery apparatus 1 is a terminal device can transmit and/or receive data through a communication network, such as an internet network. For example, as the content delivery apparatus 1, a computer, such as a personal computer (referred to as PC) or a home information appliance, such as a DVD recorder, a DVD player, a television set, a cellular phone, or a PDA, can be used.

The content delivery apparatus 1 includes a data transceiver unit 101, a node-information management unit 102, a node-information storage 103, a tag-information management unit 104, a tag-information storage 105, a content management unit 106, a node analyzing unit 107, a content dividing unit 108, a content storage 109, a content regenerating unit 110, and an overall control unit 111.

The data transceiver unit 101 transmits and receives information to and from another node. Specifically, the data transceiver unit 101 carries out communications of contents α, tag information β, node information γ, and the like with another node.

The node-information management unit 102 manages a pieces of node information γ on another node connected to the node itself, a piece of node information γ on the node itself, and a piece of node information γ on another node unconnected to the node itself.

The node-information storage 103 stores therein the pieces of node information γ (a node information list L1) to be managed by the node-information management unit 102.

The tag information management unit 104 merges tag information β corresponding to a content α held by its own node 1 with tag information β received from downstream nodes to thereby create a tag information list L2. The tag information management unit 104 searches the tag information list L2 according to a content-search request from another node to thereby create a result of the search.

The tag-information storage 105 stores therein the tag information β (tag information list L2) to be managed by the tag information management unit 104.

The content management unit 106 manages a content a downloaded from another node, and divided contents αN to be delivered to downstream nodes.

When delivering the divided contents αN to downstream nodes, the node analyzing unit 107 receives the node information γ from each of the downstream nodes and determines a proper volume of division.

The content dividing unit 108 divides a content α at the volume of division determined by the node analyzing unit 107.

The content storage 109 stores therein the content α to be managed by the content management unit 106.

The content regenerating unit 110 regenerates contents.

The overall control unit 111 controls the data transfer to each of the element 101 to 110 according to requests from another node and request to another node.

Note that the content delivery apparatus 1 is designed as an electronic apparatus including: a CPU integrated with at least computing functions and control functions; a main storage unit consisting of a ROM and a RAM having functions of storing therein programs and data; and an external storage unit equipped with a hard disk.

Specifically, the data transceiver unit 101, the node-information management unit 102, the tag-information management unit 104, the content management unit 106, the node analyzing unit 107, the content dividing unit 108, the content regenerating unit 110, and the overall control unit 111 represent specific computing and control functions of the CPU.

The node-information storage 103, the tag-information storage 105, and the content storage 109 represent specific functions of the main storage unit and the external storage unit.

A program that executes various tasks in the content delivery apparatus 1 described hereinafter is stored beforehand in the main storage unit. The program can be stored in a computer-readable medium, such as a hard disk, a flexible disk, a CD-ROM, a DVD-ROM, or the like, or can be delivered via a communication network.

<Operations of Content Delivery Apparatus>

Next, operations of the content delivery apparatus 1 will be described hereinafter with reference to FIGS. 9 to 17.

FIGS. 9 and 10 are flowcharts each representing a P2P network connection task for connecting the content delivery apparatus 1 to the P2P network 10. FIGS. 11 and 12 are flowcharts each representing a content division and delivery task for dividing a content and delivering divided contents. FIGS. 13 and 14 are flowcharts each representing a tag-information distribution task for distributing tag information in upstream nodes. FIGS. 15 to 17 are flowcharts each representing a content search and transfer task for searching and transferring a content.

(P2P Network Connection Task)

The P2P network connection task will be described hereinafter with reference to FIGS. 9 and 10. The P2P network connection task is a task as a precondition for carrying out the content dividing and delivering task, the tag-information distributing task, and the content searching and transferring task. Note that FIG. 9 is a task in a node, referred to as a content delivery apparatus 1a for convenience in description, that tries to newly connect to the P2P network 10, and FIG. 10 is a task in a node, referred to as a content delivery apparatus 1b for convenience in description, to which the content delivery apparatus 1a tries to connect.

When trying to newly subscribe to the P2P network 10, the content delivery apparatus 1a reads the node information list L1 from the node information storage 103 (step S2), and determines whether the node information γ of another node (step S4). When the node information list L1 stores therein the node information γ on another node (step S4; YES), the content delivery apparatus 1a uses the node information γ on another node.

Otherwise, when the node information list L1 does not store therein the node information γ on another node (step S4; NO), the content delivery apparatus 1a accesses a management server (server equipped with node information for initial connection to the P2P network 10), obtains the node information γ on an initial destination node (step S6), and stores the obtained node information γ in the node-information storage 103 (step S8).

Next, the content delivery apparatus 1a references the node-related information described in the node information γ (node information list L1) stored in the node-information storage 103 to thereby select a destination node (step S10).

For example, the apparatus 1a selects a destination node with the preferences that are matched with the preferences of its own node.

Subsequently, the content delivery apparatus 1a sends, to the selected destination node, a connection request (step S12), and determines whether the connection is possible based on a reply, from the destination node, to the connection request (step S14).

When the connection is possible (step S14; YES), the content delivery apparatus 1a executes a process for connection to the destination node (step S18), thereafter obtains the node information list L1 from the destination node, and adds it as new node information γ the node-information storage 103 (step S20).

Otherwise, the connection is impossible (step S14; NO), the content delivery apparatus 1a obtains the node information list L1 from the requested node, and adds it as new node information γ to the node-information storage 103 (step S15). Thereafter, the content delivery apparatus 1a determines whether there is not node information γ effective as a destination node (step S16).

When there is not node information γ effective as a destination node (step S16; YES), the content delivery apparatus 1a returns to step S6, and when there is node information γ effective as a destination node (step S16; NO), the content delivery apparatus 1a returns to step S10 and finds a new destination node.

Next, the content delivery apparatus 1a determines whether the connected destination node is fixed (step S22). When the connected destination node is fixed (step S22; YES), the content delivery apparatus 1a terminates the P2P network connection task. Otherwise, when wanting to connect to another destination node (step S22; NO), the content delivery apparatus 1a returns to step S10, and finds another destination node.

On the other hand, when receiving the connection request (step S32; step S12 in FIG. 9), the content delivery apparatus 1b check its status of connections (step S34), and determines whether connection is possible (step S36). Note that the determination of whether connection is possible is carried out based on the maximum number of connections of one node in the P2P network, the busy state of its own node, and the like.

When it is determined that the connection is possible (step S36; YES), the content delivery apparatus 1b creates a connectable message, sends, to the content delivery apparatus 1a, it as a reply (step S38; corresponding to step S14 in FIG. 9), and executes a process for connection to the apparatus 1a (step S40; corresponding to step S18 in FIG. 9).

In contrast, when it is determined that the connection is impossible (step S36; NO), the content delivery apparatus 1b creates a disconnectable message, sends, to the content delivery apparatus 1a, it as a reply (step S42; corresponding to step S14 in FIG. 9).

Finally, the content delivery apparatus 1b sends, to the requesting node, the node information list stored in its own node (step S42).

Note that the flowchart of the P2P network connection task illustrated in FIG. 9 represents a method in which the content apparatus 1a that wants to newly subscribe to the P2P network 10 finds by itself a destination node to connect it. Another method in which a server for pointing to a destination node, and the content apparatus 1a accesses the server to subscribe to the P2P network 10 can be used.

(Content Division and Delivery Task)

The content division and delivery task will be described hereinafter with reference to FIGS. 11 and 12. Note that FIG. 11 is a task in an upstream node for dividing a content and delivering divided contents, in other words, a content-transmitting node (referred to as a content delivery apparatus 1a for convenience in description), and FIG. 12 is a task in a downstream node for receiving a divided content, in other words, a content-receiving node (referred to as a content delivery apparatus 1b for convenience in description).

The content delivery apparatus 1a obtains latest node information γ from downstream nodes connected thereto, and updates the node information γ on destination nodes (step S52). Next, the content delivery apparatus 1a determines whether downstream nodes are present based on the updated node information list L1 (step S54). This is to compare the line speed (upload speed) of its own node with that of alternative nodes and determine whether downstream nodes are present (a node with the line speed lower than the line speed of its own node is defined as a downstream node).

When downstream nodes are present (step S54; YES), the content delivery apparatus 1a determines a volume of one divided content αN according to the line speed of each downstream node (step S56). Then, the content delivery apparatus 1a selects one of the downstream nodes, which stores no divided contents, and sends, to the selected downstream node, a divided-content hold request (step S58).

From a replay, from the selected downstream node, to the divided-content hold request, the content delivery apparatus 1a determines whether holding of the one divided content αN is possible (step S60).

When the holding of the one divided content αN is possible (step S60; YES), the content delivery apparatus 1a transmits, to the downstream node requested to hold the one divided content αN, the determined volume of the one divided content αN (step S62).

Next, the content delivery apparatus 1a determines whether the divided-content hold request has been sent to all of the downstream nodes (step S64). When there is a downstream node to which the divided-content hold request has not been sent yet, the content delivery apparatus 1a returns to step S58, and requests it to hold an alternative one divided content αN.

On the other hand, the content delivery apparatus 1b transmits, to an upstream node connected thereto, latest node information γ stored in its own node (step S72; corresponding to step S52 in FIG. 11).

Next, the content delivery apparatus 1b receives the divided-content hold request from the upstream node connected thereto (step S74; corresponding to step S58 in FIG. 11), and determines whether its own node is in a state for holding a corresponding divided content αN (step S76). Note that the determination of whether its own node is in a state for holding the divided content αN based on the free storage space of its own node, the busy state of its own node, and the like. Note that the divided-content hold request includes the volume of a corresponding divided content αN.

Upon determining that its own node is in a state for holding a corresponding divided content αN (step S76; YES), the content delivery apparatus 1b creates a holdable message, sends it to the content delivery apparatus 1a as a reply (step S78; corresponding to step S60 in FIG. 11), and thereafter, receives a corresponding divided content αN from the content delivery apparatus 1a (step S82; corresponding to step S62 in FIG. 11).

Next, the content delivery apparatus 1b creates tag information βN corresponding to the received divided content αN, and additionally writes it into its own tag information list L2 (step S84). Note that the tag information list L2 to which the new tag information L2 is described is periodically transmitted to upstream nodes as described hereinafter.

In contrast, upon determining that its own node is not in a state for holding the divided content αN (step S76; NO), the content delivery apparatus 1b creates a hold refusing message, and sends it to the content delivery apparatus 1a as a reply (step S80; corresponding to step S60 in FIG. 11).

Note that, in the flowcharts of the content division and delivery task illustrated in FIGS. 11 and 12, an upstream mode grasps, based on the received node information γ on downstream nodes, the line speeds of the downstream nodes, but can grasp the line speeds of the downstream nodes using another method. For example, when receiving the node information γ from downstream nodes (in step S52 of FIG. 11), an upstream node can actually measure the line speeds of the downstream nodes to thereby grasp them.

(Tag-Information Distribution Task)

The tag-information distribution task will be described hereinafter with reference to FIGS. 13 and 14. Note that FIG. 13 is a task in a downstream node (referred to as a content delivery apparatus 1a for convenience in description) for delivering its tag information list L2 to an upstream node, and FIG. 14 is a task in an upstream node (referred to as a content delivery apparatus 1b for convenience in description) for receiving the tag information list L2 from downstream nodes.

The content delivery apparatus 1a periodically transmits its own tag information list L2 to an upstream node (step S92).

On the other hand, every time when periodically receiving the tag information list L2 (step S102; corresponding to step S92 in FIG. 13), the content delivery apparatus 1b reflects the received tag information list L2 on its held tag information list L2 to thereby create tag information list L2 on which the new tag information is reflected, and stores it in the tag-information storage 105 (step S104).

Note that, in the tag-information distribution task, because the updating of the content-hold location of the tag information β is carried out at a predetermined probability, when becoming a new content-holding location, a node serves as a relay node for content distributions, and can hold published contents (delivery target contents).

(Content Search and Transfer Task)

The content search and transfer task will be described hereinafter with reference to FIGS. 15 to 17. Note that FIG. 15 is a task in a node for sending a content-search request and downloading a desired content (referred to as a content delivery apparatus 1a for convenience in description). FIG. 16 is a task in a node for searching contents (referred to as a content delivery apparatus 1b for convenience in description). FIG. 17 is a task in a node that publishes and holds the desired content and for uploading the desired content (referred to as a content delivery apparatus 1c for convenience in description).

The content delivery apparatus 1a sends, to each upstream node adjacent thereto, a content-search request in step S112, and determines whether there is a search-requested content α based on a reply, from each upstream node, to the content-search request (step S114). This is to determine whether tag information β on the search-requested content α (tag information β with the content ID identical to the content ID of the search-requested content α) is received by the apparatus 1a.

When there is a search-requested content α, the content delivery apparatus 1a selects any one of received pieces of tag information β, accesses a node described in the selected piece of tag information β to send, to it, a content-download request (step S116), and determines whether the downloading is possible based on a reply, from the accessed node, to the content-download request (step S118).

When the downloading of the content α is possible, the content delivery apparatus 1a carries out a process of downloading the content α (step S120). This allows the desired content α (entire content or divided content) to be downloaded from the accessed node.

Next, the content delivery apparatus 1a determines whether the request for alternative nodes to execute the downloading is possible based on the replies to the content-search request (step S122).

When the request for an alternative node to execute the downloading is possible (step S122; YES), the content delivery apparatus 1a returns to step S116 to request the alternative node to download the content α. This is carried out in cases where pieces of tag information β are received, and a node described in each piece of tag information β holds a corresponding divided content αN for the same content.

Otherwise, the request for alternative nodes to execute the downloading is impossible (step S122; NO), the content delivery apparatus 1a merges divided contents αN that have been parallely downloaded into an original content α0 (step S104). Of course, when an entire content α0 is downloaded, there is no need to merge it.

On the other hand, when receiving the content-search request from the content delivery apparatus 1a (step S132; corresponding to step S112 in FIG. 15), the content delivery apparatus 1b searches tag information list L2 stored in its own tag information storage 105 for the search-requested content α, and sends, to the content delivery apparatus 1a, found tag information β (step S134; corresponding to step S114 in FIG. 15). Note that, when the search-requested content α is not found in its own tag information list L2, the content delivery apparatus 1a sends, to more upstream nodes, the content-search request, and allows a result of the search to be returned from each of the more upstream nodes. The upper limit of upstream nodes to which the content-search request should be transmitted can be defined as a hop count contained in the content-search request, or defined as specifications of the P2P network 10.

On the other hand, when receiving the content-download request from the content delivery apparatus 1a (step S142; corresponding to step S116 in FIG. 15), the content delivery apparatus 1c determines whether its own node is in a state for uploading the content α (step S144). Note that the determination of whether its own node is in a state for uploading the content α based on the busy state of its own node, the presence or absence of the content α, and the like.

Upon determining that its own node is in a state for uploading the requested content α, the content delivery apparatus 1c creates a transferable message, sends it to the content delivery apparatus 1a as a reply (step S146; corresponding to step S118 in FIG. 15), and thereafter, executes a process to upload the content α(step S148; corresponding to step S120 in FIG. 15).

This allows the desired content α (an entire content or a divided content) to be uploaded from the content delivery apparatus 1b to the content delivery apparatus 1a.

In contrast, upon determining that its own node is not in a state for uploading the requested content α, the content delivery apparatus 1c creates an untransferable message, and sends it to the content delivery apparatus 1a as a reply (step S150; corresponding to step S118 in FIG. 15).

As described above, according to this embodiment, in a P2P network in which:

nodes are defined, according to line speeds connected to the nodes, as upstream and downstream nodes; and tag information indicative of information on files of contents or the locations of the contents are distributed so that the contents are delivered among the nodes, each of the downstream nodes holds a divided content that meets its situation of a corresponding node in addition to the upstream nodes.

For this reason, it is possible to effectively use a network band of a downstream node to download a content. This reduces a burden on the upstream nodes, thus making the entire P2P network efficient. In addition, divided contents can be downloaded in parallel from a plurality of nodes, and therefore, it is possible to speed up the downloading.

Conventionally, the network band of downstream nodes may be a bottleneck in content deliveries so that it is not factored in content deliveries. However, this allows the network band of the downstream nodes to be effectively used.

Note that, in this embodiment, because divided contents are handled, a node for division and delivery of contents can reduce a time required to delivery a content, and a node for upload of contents can reduce its uploading load.

More many downstream nodes hold part of popular contents, and therefore, the number of nodes that can simultaneously download divided contents of a popular content is increased, thus permitting more effective deliveries.

Modifications of First Embodiment

The first embodiment has been described, and various modifications can be applied to the content delivery method according to the first embodiment.

For example, in the content division and delivery task of the content delivery method according to this embodiment, a content transmitting node is configured to hold a content as a target of division (non-divided content) in itself, but can be configured to delete the non-divided content) after transferring a divided content to a content receiving node.

FIG. 18 illustrates a P2P network 10A schematically representing such a content delivery method. For example, when a node A divides its own held content α0 into divided contents, and delivers them to downstream nodes C and D adjacent thereto, respectively, the node A can delete the content α0 after delivering the divided contents to the nodes C and D.

Moreover, when a node D divides its own held content α2 into divided contents, and delivers them to downstream nodes W, X, Y, and Z adjacent thereto, respectively, the node D can delete the content α2 after delivering the divided contents to the nodes W, X, Y, and Z.

As a result, it is possible to further reduce a load of the storage capacity of the upstream nodes.

In addition, as illustrated in FIG. 19, in the content division and delivery task of the content delivery method according to this embodiment, it is possible to divide a content for downstream nodes adjacent thereto in addition to its own node.

For example, when node A divides its own held content α0 into divided contents, and delivers them to downstream nodes C and D adjacent thereto, the node A can divide the content α0 into divided contents for the respective nodes A, C, and D. Moreover, when node D divides its own held content α2 into divided contents and delivers them to downstream nodes W, X, Y, and Z, the node D can divide the content α2 into divided contents for the respective nodes D, W, X, Y, and Z.

Second Embodiment

<Content Delivery Method>

A content delivery method according to a second embodiment of the present invention will be described.

The content delivery method according to this embodiment is different in only a point of management of the tag information β from that according to the first embodiment, and therefore, is substantially identical in the remaining points thereto. Note that, in this embodiment, elements and operations different from the first embodiment are only described, and other elements and operations are omitted in description with the same reference characters attached to the same portions.

FIG. 20 illustrates the P2P network 10 schematically representing the content delivery method according to the first embodiment while focusing on the tag information β.

As described above, the content delivery method according to the first embodiment divides the content α according to the situations of downstream nodes, and delivers the divided contents αN to the downstream nodes. This results in that pieces of tag information β are delivered while the number of the pieces of tag information β increases with increase in the number of divided contents αN.

For example, when the content α is divided into ten divided contents and the ten divided contents are delivered to downstream nodes, ten pieces of tag information β on the same content α. Thus, the number of pieces of tag information β are increased so that the traffic within the P2P network 10 is increased.

FIG. 20 illustrates an overview of such a P2P network 10. Specifically, how pieces of tag information β is distributed in the P2P network 10 when a node A divides its held content α0 and distributes divided contents to respective node C and node D, and a node D divides its held content α2 and distributes divided contents to respective nodes W, X, Y, and Z. As seen from the illustration, the number of pieces of tag information β is increased in upstream nodes. This may cause a problem that increases the traffic within the P2P network 10.

The content delivery method according to this embodiment is adapted to improve this point.

FIGS. 21 and 22 illustrates a P2P network 20 that schematically represents the content delivery method according to this embodiment of the present invention. Note that, like the P2P network 10, the P2P network 10 is a network in which:

nodes are defined, according to speeds (specifically, upstream speeds) of lines connected to the nodes, as upstream and downstream nodes (relationships between the upstream and downstream are relative relationships between nodes and another node connected to the nodes; and tag information indicative of information on files of contents or the locations of the contents are distributed so that the contents are delivered among the nodes.

One example of the P2P network is a P2P network formed by computes, as nodes, each installed with P2P file sharing software, such as Winny. In other words, the P2P network 20 is configured such that:

nodes connected to high communication networks are defined as upstream nodes;

nodes connected to low communication networks are defined as downstream nodes; and contents and their index information are more gathered in the upstream nodes to thereby enhance the content-search efficiency or the content-delivery efficiency.

Note that the content delivery method according to this embodiment can be implemented by installing a content delivery program according to this embodiment of the present invention into each node (referred to as content delivery apparatus hereinafter).

In addition to functions provided in the Winny, the content delivery program according to this embodiment includes:

a content division and delivery function of dividing public contents (delivery target contents) and delivering the divided public contents to downstream nodes; and a tag-information merge and delivery function of merging divided published pieces of tag information with each other to deliver it. Note that FIG. 21 is a view describing the content division and delivery function, and FIG. 22 is a view describing the tag-information merge and delivery function.

The content delivery method according to this embodiment is a method in which content-publishing nodes divide a publish content according to the situations of downstream nodes adjacent thereto, and cause the adjacent downstream nodes to hold divided publish contents. This method causes the downstream nodes, in addition to the upstream nodes, to be responsible for a part of content-deliveries to thereby effectively use the downstream nodes.

Note that the situation of a downstream node means, for example, the speed of a line to which the downstream node is connected. A downstream node is adapted to hold, by itself, a divided content the volume of which depends on the line speed (the lower the line speed to which a downstream node is connected is, the more the volume to be held is reduced).

When downloading the content, a content searching node downloads the divided contents in parallel from a plurality of downstream nodes that hold the divided contents, thus increasing the speed of the downloading. As described above, the content delivery method according to this embodiment is designed to transfer, to a content searching node, a divided content, the volume of which depends on a band of a communication network to which a downstream node is connected, even if the band is small. For this reason, the content delivery method can effectively use the small network band, thus effectively using downstream nodes.

In addition, when pieces of tag information on divided contents for a same content are received, the pieces of tag information are merged into one piece of tag information to be distributed to upstream nodes. For this reason, it is possible to restrict the increase in traffic with increase in the number of pieces of tag information and reduce a burden on upstream nodes required to manage tag information.

Specific descriptions will be provided with reference to FIGS. 21 and 22.

For example, when a node A illustrated in FIG. 21 publishes a content $\alpha 0$, the node A sends, to each of nodes C and D downstream of the node A, a content-hold request. The content-hold request requests each of the nodes C and D to hold a volume of the content; this volume meets the situation of a corresponding one of the nodes C and D. For example, in FIG. 21, holding of ⅜ of the content $\alpha 0$ is requested for the node C, and holding of ⅝ thereof is requested for the node D. In this specific example, the content $\alpha 0$ is divided in proportional to the line speed of the node C and that of the node D.

When receiving a reply, from each of the nodes C and D, representing that content-hold request can be carried out, the node A transmits a requested volume of a divided content $\alpha 1$ to the node C, and a requested volume of a divided content $\alpha 2$ to the node D. Moreover, the node A deletes its held content $\alpha 0$.

This results in that the node C holds the divided content $\alpha 1$, creates tag information $\beta 1$ on the content $\alpha 1$ representing that the node C holds the divided content $\alpha 1$, and delivers the tag information $\beta 1$ to upstream nodes adjacent thereto. In addition, the node D holds the divided content $\alpha 2$, creates tag information $\beta 2$ on the content $\alpha 2$ representing that the node D holds the divided content $\alpha 2$, and delivers the tag information $\beta 2$ to upstream nodes adjacent thereto.

Note that a node that has received a divided content and stored it can send, to downstream nodes adjacent thereto, a content-hold request.

For example, the node D illustrated in FIG. 21 is operative to send, to downstream nodes W, X, Y, and Z downstream of the node D, a content-hold request. The content-hold request requests the node W to hold ⅛ of the content $\alpha 0$, the node X to hold ⅛ of the content $\alpha 0$, the node Y to hold ⅖ of the content $\alpha 0$, and the node Z to hold ⅛ of the content $\alpha 0$. Of course, the volume of each of the divided contents is determined depending on the situations (line speeds) of the individual nodes.

When receiving a reply, from each of the nodes W, X, Y, and Z, representing that content-hold request can be carried out, the node D transmits a corresponding requested volume of a divided content to each of the nodes W, X, Y, and Z. Moreover, the node D deletes its held content $\alpha 2$.

This results in that the node W holds a divided content $\alpha 3$, creates tag information $\beta 3$ on the content $\alpha 3$ representing that the node W holds the divided content $\alpha 3$, and delivers the tag information $\beta 3$ to upstream nodes adjacent thereto.

Similarly, the node X holds a divided content $\alpha 4$, creates tag information $\beta 4$ on the content $\alpha 4$ representing that the node X holds the divided content $\alpha 4$, and delivers the tag information $\beta 4$ to upstream nodes adjacent thereto. Moreover, the node Y holds a divided content $\alpha 5$, creates tag information $\beta 5$ on the content $\alpha 5$ representing that the node Y holds the divided content $\alpha 5$, and delivers the tag information $\beta 5$ to upstream nodes adjacent thereto. Furthermore, the node Z holds a divided content $\alpha 6$, creates tag information $\beta 6$ on the content $\alpha 6$ representing that the node Z holds the divided content $\alpha 6$, and delivers the tag information $\beta 6$ to upstream nodes adjacent thereto.

At that time, as illustrated in FIG. 22, when receiving the tag information $\beta 3$, the tag information $\beta 4$, the tag information $\beta 5$, and the $\beta 6$ from the adjacent downstream nodes W, X, Y, and Z, respectively, the node D merges the pieces $\beta 3$ to $\beta 6$ of tag information into tag information $\beta 2$ because these pieces $\beta 3$ to $\beta 6$ of tag information correspond to a same content (same content ID). Then, the node D delivers the tag information $\beta 2$ to an upstream node adjacent thereto.

The tag information $\beta 2$ consists of:

mixed pieces of bit map information included in the pieces $\beta 3$, $\beta 4$, $\beta 5$, and $\beta 6$ of tag information to be merged with each other; and a content-hold location that is set to its own node.

Note that the pieces $\beta 3$, $\beta 4$, $\beta 5$, and $\beta 6$ of tag information are not distributed to upstream nodes, and they are managed in the node D.

Similarly, when receiving the tag information $\beta 1$ and the tag information $\beta 2$ from the adjacent downstream nodes C and D, respectively, the node A merges the pieces $\beta 1$ and $\beta 2$ of tag information into tag information $\beta 0$ because these pieces $\beta 1$ and $\beta 2$ of tag information correspond to a same content (same content ID). Then, the node A delivers the tag information $\beta 0$ to an upstream node adjacent thereto. Note that the pieces $\beta 1$ and $\beta 2$ of tag information are not distributed to upstream nodes, and they are managed in the node A.

The content delivery method according to this embodiment can carry out content division over a plurality of layered nodes. For this reason, an original node is subdivided to be distributedly arranged in more downstream nodes; this reduces unevenly distributed contents in the entire P2P network 10. In addition, pieces of tag information for divided contents are merged to be delivered to upstream nodes. This can restrict distributions of pieces of tag information to upstream nodes, and can reduce the traffic of pieces of tag information to be distributed the entire P2P network 20.

On the other hand, when trying to download the content $\alpha 0$, a node E illustrated in FIG. 22 sends, to an upstream node adjacent thereto, a search query for the content $\alpha 0$. Thereafter, the node E receives, from the adjacent upstream node, the tag information $\beta 0$ representing the location of the content $\alpha$ and the pieces $\beta 1$ to $\beta 6$ of tag information each of which represents the location of a corresponding divided content.

Thus, in accordance with the pieces $\beta 0$ to $\beta 6$ of tag information, the node E downloads, from the nodes that store the content $\alpha 0$ and the divided contents $\alpha N$ of the content $\alpha 0$, the content $\alpha 0$ and the divided contents $\alpha N$.

In an example illustrated in FIG. 22, the node E simultaneously downloads the content $\alpha 0$ and the divided contents $\alpha N$ in parallel from the nodes A and D. However, as illustrated in FIG. 21, because the nodes A and D actually hold no contents, each of the nodes A and B transmits internally managed tag information to the node E. Specifically, the node A transmits the pieces $\beta 1$ and $\beta 2$ of tag information to the node E, and the node D transmits the pieces $\beta 3$ to $\beta 6$ of tag information to the node E.

As a result, the node E can grasp nodes that actually hold the divided contents $\alpha N$, and therefore, it downloads the divided contents $\alpha N$ from the corresponding nodes. After the downloading, the node E merges the divided contents $\alpha N$ into the one content $\alpha 0$.

As described above, the content delivery method according to this embodiment simultaneously downloads a plurality of divided contents in parallel from a plurality of downstream nodes, making it possible to effectively use downstream nodes, and speed up downloads.

<Data Configuration>

The data formats of a content $\alpha$ and tag information $\beta$ to be distributed in the P2P network 20 are the same as those described in the first embodiment, and the data format of node information $\gamma$ to be used in the P2P network 20 is the same as that described in the first embodiment. Thus, the data formats of a content $\alpha$, tag information $\beta$, and node information $\gamma$ are omitted in description.

<Configuration of Content Delivery Apparatus>

FIG. 23 is a schematic structural view of a node (content delivery apparatus) 2 in the P2P network 20. As well as the content delivery apparatus 1, the content delivery apparatus 2 is a terminal device can transmit and/or receive data through a communication network, such as an Internet network. For example, as the content delivery apparatus 1, a computer, such as a personal computer (referred to as PC) or a home information appliance, such as a DVD recorder, a DVD player, a television set, a cellular phone, or a PDA, can be used.

The content delivery apparatus 2 includes the data transceiver unit 101, the node-information management unit 102, the node-information storage 103, a tag-information management unit 201, a tag arranging/merging unit 202, a tag-information storage 203, the content management unit 106, the node analyzing unit 107, the content dividing unit 108, the content storage 109, the content regenerating unit 110, and the overall control unit 111.

The tag information management unit 201 arranges received pieces of tag information $\beta$ from downstream nodes to thereby create a tag information list L2 to be periodically distributed to upstream nodes, and internally-managed tag information list L3 to be internally managed. The tag information management unit 201 searches the tag information list L2 and the internally-managed tag information list L3 according to a content-search request from another node to thereby create results of the searches. Note that, in this embodiment, the tag information list L2 and the internally-managed tag information list L3 are managed as individual information lists. However, information of the tag information list L2 and that of the internally-managed tag information list L3 can be managed on a same tag information list.

The tag arranging/merging unit 202 merges pieces of tag information $\beta$ into new tag information $\beta$ when the pieces of tag information $\beta$ for a same content are stored in the received tag information list L2 from another node. The generated tag information $\beta$ is reflected on the tag information list L2, and the pieces of tag information $\beta$ before merging are reflected on the internally-managed tag information list L3.

The tag-information storage 203 stores therein the pieces of tag information $\beta$ (tag information list L2 and internally-managed tag information list L3) to be managed by the tag information management unit 201.

Note that the content delivery apparatus 2 is designed as an electronic apparatus including: a CPU integrated with at least computing functions and control functions; a main storage unit consisting of a ROM and a RAM having functions of storing therein programs and data; and an external storage unit equipped with a hard disk.

Specifically, the data transceiver unit 101, the node-information management unit 102, the tag-information management unit 201, the tag arranging/merging unit 202, the content management unit 106, the node analyzing unit 107, the content dividing unit 108, the content regenerating unit 110, and the overall control unit 111 represent specific computing and control functions of the CPU.

The node-information storage 103, the tag-information storage 203, and the content storage 109 represent specific functions of the main storage unit and the external storage unit.

A program that executes various tasks in the content delivery apparatus 1 described hereinafter is stored beforehand in the main storage unit. The program can be stored in a computer-readable medium, such as a hard disk, a flexible disk, a CD-ROM, a DVD-ROM, or the like, or can be delivered via a communication network.

<Operations of Content Delivery Apparatus>

Next, operations of the content delivery apparatus 2 will be described hereinafter with reference to FIGS. 24 to 27.

FIGS. 24 and 25 are flowcharts each representing a tag-information distribution task for distributing tag information in upstream nodes. FIGS. 26 and 27 are flowcharts each representing a content search and transfer task for searching and transferring a content. Note that, because the P2P network connection task and the content division and delivery task are the same as those described in the first embodiment, they are omitted in description.

(Tag-Information Distribution Task)

The tag-information distribution task will be described hereinafter with reference to FIGS. 24 and 25. Note that FIG. 24 is a task in a downstream node (referred to as a content delivery apparatus 2a for convenience in description) for delivering its tag information list L2 to an upstream node, and FIG. 25 is a task in an upstream node (referred to as a content delivery apparatus 2b for convenience in description) for receiving the tag information list L2 from downstream nodes.

The content delivery apparatus 2a periodically transmits its own tag information list L2 to an upstream node (step S252).

On the other hand, every time when periodically receiving the tag information list L2 (step S262), the content delivery apparatus 2b compares the received tag information list L2 with its held tag information list L2 to thereby search whether there are the same contents (step S264).

When there are the same contents (step S266; YES), the content delivery apparatus 2b merges a plurality of pieces of tag information $\beta$ based on the same content ID into new tag information $\beta$, creates new tag information list L2 on which the new tag information β is reflected, and stores it in the tag-information storage 203 (step S268).

Next, the content delivery apparatus 2b creates internally managed tag information list L3 on which the pieces of tag information β to be used for the merging in the tag information β of the received tag information list L2 are reflected, and stores it in the tag-information storage 202 (step S270).

Note that, in the tag-information distribution task, because the updating of the content-hold location of the tag information β is carried out at a predetermined probability, when becoming a new content-holding location, a node serves as a relay node for content distributions, and can hold published contents (delivery target contents).

(Content Search and Transfer Task)

The content search and transfer task will be described hereinafter with reference to FIGS. 26 and 27. Note that FIG. 26 is a task in a node for sending a content-search request and downloading a desired content (referred to as a content delivery apparatus 2a for convenience in description). FIG. 27 is a task in a node that publishes and holds the desired content and for uploading the desired content (referred to as a content delivery apparatus 2c for convenience in description). Note that a task in a node for searching contents (referred to as a content delivery apparatus 2b for convenience in description is the same as that described in the first embodiment, and therefore, it is omitted in description.

The content delivery apparatus 2a sends, to each upstream node adjacent thereto, a content-search request in step S202, and determines whether there is a search-requested content α based on a reply, from each upstream node, to the content-search request (step S204). This is to determine whether tag information β on the search-requested content α (tag information β with the content ID identical to the content ID of the search-requested content α) is received by the apparatus 2a.

When there is a search-requested content α, the content delivery apparatus 2a selects any one of received pieces of tag information β, accesses a node described in the selected piece of tag information β to send, to it, a content-download request (step S206), and determines whether the downloading is possible based on a reply, from the accessed node, to the content-download request (step S208).

When the downloading of the content α is possible, the content delivery apparatus 2a carries out a process of downloading the content α (step S210). This allows the desired content α (entire content or divided content) to be downloaded from the accessed node.

Otherwise, the downloading is impossible (step S208; NO), the content delivery apparatus 2a determines whether it allows receipt of pieces of tag information β on the content α (pieces of tag information β each with the same content ID as the content ID of the content α) based on the replies to the content-download request from the accessed nodes (step S212).

When allowing the receipt of the pieces of tag information β on the content α (step S212; YES), the content delivery apparatus 2a receives the pieces of tag information β (step S214), and adds the received pieces of tag information β as target nodes to which the content-download request should be sent (step S216).

Next, the content delivery apparatus 2a determines whether the request for alternative nodes to execute the downloading is impossible based on the replies to the content-search request (step S218).

When the request for an alternative node to execute the downloading is possible (step S218; NO), the content delivery apparatus 2a returns to step S206 to request the alternative node to download the content α.

Otherwise, the request for alternative nodes to execute the downloading is impossible (step S122; YES), the content delivery apparatus 2a merges divided contents αN that have been parallely downloaded into an original content α0 (step S220). Of course, when an entire content α0 is downloaded, there is no need to merge it.

On the other hand, when receiving the content-download request from the content delivery apparatus 2a (step S232; corresponding to step S206 in FIG. 15), the content delivery apparatus 2c determines whether its own node holds the requested content α(step S234). Because the content delivery apparatus 2 is provided with the tag-information arranging/merging function, it may not hold the content α itself even if the tag information β indicates its own node as the hold location of the content α.

When its own node holds the requested content α (step S234; YES), the content delivery apparatus 2c determines whether its own node is in a state for uploading the content α (step S236). Note that the determination of whether its own node is in a state for uploading the content α based on the busy state of its own node, the presence or absence of the content α, and the like.

Upon determining that its own node is in a state for uploading the requested content α (step S236; YES), the content delivery apparatus 2c creates a transferable message, sends it to the content delivery apparatus 1a as a reply (step S238; corresponding to step S208 in FIG. 26), and thereafter, executes a process to upload the content α (step S240; corresponding to step S210 in FIG. 26).

This allows the desired content α (an entire content or a divided content) to be uploaded from the content delivery apparatus 2b to the content delivery apparatus 2a.

In contrast, upon determining that its own node cannot upload the requested content α (step S236; NO), the content delivery apparatus 2c creates an untransferable message, and sends it to the content delivery apparatus 2a as a reply (step S244; corresponding to step S208 in FIG. 26).

In addition, when its own node does not hold the requested content α, the content delivery apparatus 2c determines whether pieces of tag information β on the content α (pieces of tag information β each with the same content ID as the content ID of the content α) are stored in the internally-managed tag information list L2 (step S242).

When the pieces of tag information β on the content α are stored in the internally-managed tag information list L2 (step S242; YES), the content delivery apparatus 2c creates a tag-information transferable message representing that the pieces of tag information β is transferable (step S246). Then, the content delivery apparatus 2c sends the tag-information transferable message to the content delivery apparatus 2a as a reply (step S248; corresponding to step S214 in FIG. 26), and thereafter, transfers the pieces of tag information β to the content delivery apparatus 2a.

Otherwise, when the pieces of tag information β on the content α are not stored in the internally-managed tag information list L2 (step S242; NO), the content delivery apparatus 2c creates an untransferable message, and sends it to the content delivery apparatus 2a as a reply (step S244; corresponding to step S208 in FIG. 26).

As described above, this embodiment can achieve the same advantages as those of the first embodiment.

Specifically, in a P2P network in which:

nodes are defined, according to line speeds connected to the nodes, as upstream and downstream nodes; and tag information indicative of information on files of contents or the locations of the contents are distributed so that the contents are delivered among the nodes, each of the downstream nodes holds a divided content that meets its situation of a corresponding node in addition to the upstream nodes.

For this reason, it is possible to effectively use a network band of a downstream node to download a content. This reduces a burden on the upstream nodes, thus making the entire P2P network efficient. In addition, divided contents can be downloaded in parallel from a plurality of nodes, and therefore, it is possible to speed up the downloading.

In addition, in addition to the advantages of the first embodiment, when a plurality of pieces of tag information on divided contents of a same content are received from downstream nodes, the received pieces of tag information are merged into one tag information to be distributed in upstream nodes. This makes it possible to reduce the traffic volume of pieces of tag information to be distributed in the P2P network.

Note that, in the content delivery method according to this embodiment, content transmitting nodes are adapted to delete a content as a target of division (undivided content), but can hold the undivided content in its own node.

The merged tag information is not transmitted to upstream nodes after pieces of tag information on divided contents from downstream nodes have been received by its own node and the merged tag information has been created by its own node but can be transmitted when the divided contents are delivered to the downstream nodes. Specifically, when delivering the divided contents, a node can previously create tag information the hold location of which is set to its own node, and can deliver the created tag information to upstream nodes.

The embodiments of the present invention have been described, and they can be subjected to various deformations and modifications within the scope of the present invention.

For example, in the embodiments and their modifications, a content is divided into a plurality of divided contents that are not overlapped with each other for a plurality of nodes, respectively. However, a content can be divided into a plurality of divided contents part of which are overlapped with each other. In addition, according to the situations of downstream nodes (for example, a large storage is provided, and a connected line speed is high), a content held in an upstream node can be delivered without being divided.

Moreover, when a plurality of contents that should be delivered are held, the number of contents in the plurality of delivery-target contents to be delivered to downstream nodes can be determined according to the situations of the downstream nodes (the plurality of delivery-target contents can be divided in contents, for example, three contents in ten contents are delivered to downstream nodes). In this case, to some delivery target contents (a group of significant contents, such as same genre contents or same artist's contents), same content IDs are set (the bitmap information of tag information β is information representing which of parts in the group of a plurality of delivery-target contents).

In addition, in the embodiments and their modifications, the volume of contents to be held in a downstream node is determined by an upstream node, but can be determined by the downstream node. Based on the determined volume, the upstream node can deliver a divided content to the downstream node.

Moreover, in the embodiments and their modifications, the line speed (network band) to which a downstream node is connected is considered as the situation of the downstream node, but the situation of a downstream node in the content division and delivery task is not limited thereto.

For example, the free storage space, and the processing capacity and the busy state of a node can be additionally considered. In addition, an appropriate node to which a divided content is to be delivered can be selected according to the language of the delivered content, the supported languages of nodes, the geographic situations of nodes, and the like. An appropriate node to which a divided content is to be delivered can be selected according to user's preferences.

Furthermore, a server with a backup function of including publish contents can be provided in addition to each node, which is different from pure P2P networks. If content deliveries between contents were not functioned due to any accident, contents can be downloaded from the server. This can more enhance the stability of the content delivery methods according to the embodiments.

The invention claimed is:

1. A content delivery apparatus constituting a node of a P2P network, the P2P network that:
 defines, as a downstream node, a sender node for transmitting, to an adjacent node, tag information indicative of locations of holding nodes that hold delivery target contents and information of the holding nodes;
 defines, as an upstream node, a destination node for receiving the tag information; and
 gathers the tag information more in the upstream node to increase content-search efficiency or content-delivery efficiency,
 the content delivery apparatus comprising:
 a tag information storage means that stores tag information of a delivery target content held in its own node and tag information received from each downstream node adjacent to its own node;
 a tag information merging means that, when there is a plurality of divided pieces of tag information for divided contents created by dividing the same content or a plurality of divided pieces of tag information for divided contents created by dividing, in contents, a group of a plurality of contents in the tag information stored in the tag information storage means, merges the plurality of divided pieces of tag information into merged tag information, and stores the merged tag information in the tag information storage means and in an internal tag information storage means that internally manages the plurality of merged pieces of tag information;
 a tag information distributing means that transmits the merged tag information to an upstream node adjacent to its own node; and
 a content transmitting means that, in response to a download request from an alternative node, uploads the delivery target content held by its own node to the download requesting node,
 wherein the tag information includes part information which part of an entire content is held,
 the tag information merging means merges pieces of the part information of the pieces of tag information on the divided contents with each other, and creates the merged tag information by setting the location of the held node as its own node, and
 the content transmitting means comprises:
 means for uploading the delivery target content held by its own node to the download requesting node when its own node holds the delivery target content; and
 means for transmitting, when its own node does not hold the delivery target content and stores a plurality of pieces of tag information on a content that is the same as the delivery target content in the internal tag information storage means, the plurality of pieces of tag information stored in the internal tag information storage means to the download requesting node.

2. The content delivery apparatus according to claim 1, further comprising a content receiving means that parallely downloads the divided contents from the holding nodes, the content receiving means comprising:
means for downloading the divided contents when downloading is possible;
means for receiving the plurality of pieces of tag information when the downloading is impossible and receipt of the plurality of pieces of tag information is possible; and
means, when the plurality of pieces of tag information are received, for accessing, based on the locations of the holding nodes of the plurality of pieces of tag information, the holding nodes to thereby parallely download the divided contents from the holding nodes, respectively.

3. The content delivery apparatus according to claim 1, further comprising:
a downstream-node situation obtaining means that obtains information on each downstream node adjacent to its own node;
a content dividing means that determines, based on the obtained situation of each downstream node, a volume of a divided content to be delivered to each downstream node, and divides the delivery target content held in its own node according to the determined volume for each downstream node; and
a divided-content distributing means that distributes each divided content by the content dividing means to a corresponding one of the downstream nodes adjacent to its own node.

4. The content delivery apparatus according to claim 3, further comprising:
a content-hold message transmitting means that transmits, to each downstream node adjacent to its own node, a message for requesting holding of a corresponding divided content;
a divided-content delivery determining means that determines, based on a received reply from each downstream node adjacent to its own node, whether a corresponding divided content is distributed to each downstream node adjacent to its own node, the replay representing whether to allow the holding;
a content-hold request reply means, when receiving the content-hold message from the upstream node adjacent to its own node, that transmits, to the upstream node adjacent to its own node, a reply indicative of whether to allow the holding according to the situation of its own node.

5. The content delivery apparatus according to claim 3, wherein the information on the situation of each downstream node adjacent to its own node includes information on a line speed of a communication network to which each downstream node is connected,
the content dividing means determines, based on the information on the line speed, the volume of the divided content to be delivered to each downstream node.

6. The content delivery apparatus according to claim 3, wherein the content dividing means holds an undivided content after the divided contents have been distributed.

7. The content delivery apparatus according to claim 3, wherein the content dividing means deletes an undivided content after the divided contents have been distributed.

8. The content delivery apparatus according to claim 4, wherein the information on the situation of each downstream node adjacent to its own node includes information on a line speed of a communication network to which each downstream node is connected,
the content dividing means determines, based on the information on the line speed, the volume of the divided content to be delivered to each downstream node,
the content dividing means holds an undivided content after the divided contents have been distributed.

9. The content delivery apparatus according to claim 4, wherein the information on the situation of each downstream node adjacent to its own node includes information on a line speed of a communication network to which each downstream node is connected,
the content dividing means determines, based on the information on the line speed, the volume of the divided content to be delivered to each downstream node,
the content dividing means deletes an undivided content after the divided contents have been distributed.

10. A content delivery apparatus constituting a node of a P2P network, the P2P network that:
defines, as an upstream node, a node connected to a communication network higher than that to which its own node is connected;
defines as a downstream node, a node connected to a communication network lower than that to which its own node is connected; and
gathers delivery target contents and the tag information more in the upstream node to increase content-search efficiency or content-delivery efficiency, the tag information representing locations of holding nodes that hold the delivery target contents and information of the holding nodes, the content delivery apparatus comprising:
a downstream-node situation obtaining means that obtains information on each downstream node adjacent to its own node;
a content dividing means that determines, based on the obtained situation of each downstream node, a volume of a divided content to be delivered to each downstream node, and divides the delivery target content held in its own node according to the determined volume for each downstream node;
a divided-content distributing means that distributes each divided content by the content dividing means to a corresponding one of the downstream nodes adjacent to its own node;
a tag information storage means that stores tag information of a delivery target content held in its own node and tag information received from each downstream node adjacent to its own node;
a tag information merging means that, when there is a plurality of divided pieces of tag information for divided contents created by dividing the same content or a plurality of divided pieces of tag information for divided contents created by dividing, in contents, a group of a plurality of contents in the tag information stored in the tag information storage means, merges the plurality of divided pieces of tag information into new tag information, stores the new tag information in the tag information storage means, deletes the plurality of merged pieces of tag information from the tag information storage means, and stores the plurality of merged pieces of tag information in an internal tag information storage means that internally manages tag information;
a tag information distributing means that transmits the merged tag information to an upstream node adjacent to its own node;
a content searching means that:
searches the tag information storage means when receiving the content-search request from each downstream node adjacent to its own node, when there is a content corresponding to the content-search request, transmits, to the search requesting node, tag information on the content, and when there is not a content corresponding to the content-search request, further transmits, to the upstream node adjacent to its own node;

a content receiving means that accesses, based on the locations, received as a result of the search, of the holding nodes of the plurality of pieces of tag information to request downloading, and that parallely downloads the divided contents from the holding nodes, respectively;

a content merging means that merges the downloaded divided contents into an original content; and a content transmitting means that uploads the delivery target content held in its own node to a download-requesting node, wherein the tag information includes part information which part of an entire content is held, the tag information merging means merges pieces of the part information of the pieces of tag information on the divided contents with each other, and creates the merged tag information by setting the location of the held node as its own node, and the content transmitting means comprises:

means for uploading the delivery target content held by its own node to the download requesting node when its own node holds the delivery target content; and means for transmitting, when its own node does not hold the delivery target content and stores a plurality of pieces of tag information on a content that is the same as the delivery target content in the internal tag information storage means, the plurality of pieces of tag information stored in the internal tag information storage means to the download requesting node.

11. A content delivery method in a P2P network, the P2P network that:

defines, as a downstream node, a sender node for transmitting, to an adjacent node, tag information indicative of locations of holding nodes that hold delivery target contents and information of the holding nodes;

defines, as an upstream node, a destination node for receiving the tag information; and gathers the tag information more in the upstream node to increase content-search efficiency or content-delivery efficiency, the content delivery method comprising:

a tag information storing step of storing, in a tag information storage means, tag information of a delivery target content held in its own node and tag information received from each downstream node adjacent to its own node;

a tag information merging step of, when there is a plurality of divided pieces of tag information for divided contents created by dividing the same content or a plurality of divided pieces of tag information for divided contents created by dividing, in contents, a group of a plurality of contents in the tag information stored in the tag information storage means, merging the plurality of divided pieces of tag information into merged tag information, and storing the merged tag information in the tag information storage means and in an internal tag information storage means that internally manages the plurality of merged pieces of tag information;

a tag information distributing step of transmitting the merged tag information to an upstream node adjacent to its own node; and a content transmitting step of, in response to a download request from an alternative node, uploading the delivery target content held by its own node to the download requesting node, wherein the tag information includes part information which part of an entire content is held, the tag information merging step merges pieces of the part information of the pieces of tag information on the divided contents with each other, and creates the merged tag information by setting the location of the held node as its own node, and the content transmitting step comprises the steps of:

uploading the delivery target content held by its own node to the download requesting node when its own node holds the delivery target content; and transmitting, when its own node does not hold the delivery target content and stores a plurality of pieces of tag information on a content that is the same as the delivery target content in the internal tag information storage means, the plurality of pieces of tag information stored in the internal tag information storage means to the download requesting node.

12. A content delivery program readable by a node of a P2P network, the P2P network that:

defines, as a downstream node, a sender node for transmitting, to an adjacent node, tag information indicative of locations of holding nodes that hold delivery target contents and information of the holding nodes;

defines, as an upstream node, a destination node for receiving the tag information; and gathers the tag information more in the upstream node to increase content-search efficiency or content-delivery efficiency, the content delivery program causing the node to function as:

a tag information storage means that stores tag information of a delivery target content held in its own node and tag information received from each downstream node adjacent to its own node;

a tag information merging means that, when there is a plurality of divided pieces of tag information for divided contents created by dividing the same content or a plurality of divided pieces of tag information for divided contents created by dividing, in contents, a group of a plurality of contents in the tag information stored in the tag information storage means, merges the plurality of divided pieces of tag information into merged tag information, and stores the merged tag information in the tag information storage means and in an internal tag information storage means that internally manages the plurality of merged pieces of tag information;

a tag information distributing means that transmits the merged tag information to an upstream node adjacent to its own node; and a content transmitting means that, in response to a download request from an alternative node, uploads the delivery target content held by its own node to the download requesting node, wherein the tag information includes part information which part of an entire content is held, the tag information merging means merges pieces of the part information of the pieces of tag information on the divided contents with each other, and creates the merged tag information by setting the location of the held node as its own node, and the content transmitting means comprises:

means for uploading the delivery target content held by its own node to the download requesting node when its own node holds the delivery target content; and means for transmitting, when its own node does not hold the delivery target content and stores a plurality of pieces of tag information on a content that is the same as the delivery target content in the internal tag information storage means, the plurality of pieces of tag information stored in the internal tag information storage means to the download requesting node.

* * * * *